(12) United States Patent
Higaki

(10) Patent No.: US 7,756,299 B2
(45) Date of Patent: *Jul. 13, 2010

(54) FACE REGION ESTIMATING DEVICE, FACE REGION ESTIMATING METHOD, AND FACE REGION ESTIMATING PROGRAM

(75) Inventor: Nobuo Higaki, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1244 days.

This patent is subject to a terminal disclaimer.

(21) Appl. No.: 11/301,117

(22) Filed: Dec. 13, 2005

(65) Prior Publication Data

US 2006/0126941 A1   Jun. 15, 2006

(30) Foreign Application Priority Data

Dec. 14, 2004   (JP) ............................. 2004-360772

(51) Int. Cl.
*G06K 9/00* (2006.01)
*H04N 7/18* (2006.01)
*G01P 3/36* (2006.01)

(52) U.S. Cl. ...................... 382/106; 382/103; 382/107; 382/168; 382/181; 348/154; 356/27

(58) Field of Classification Search ........... 38/117–118, 38/168, 171–173, 190, 199, 203, 266, 274, 38/289, 296; 351/206, 210, 221, 204; 396/18
See application file for complete search history.

(56) References Cited

U.S. PATENT DOCUMENTS 5,867,588 A * 2/1999 Marquardt .................. 382/118

(Continued)

FOREIGN PATENT DOCUMENTS

JP    362162175 A  *  7/1987

(Continued)

OTHER PUBLICATIONS

Ranefall et al,Finding Facials Features Using an HLS Colour Space, Lecture Notes in Computer Science; vol. 974, Proceedings of the 8th International Conference on Image Analysis and Processing, pp. 191-196, Year of Publication: 1995.*

(Continued)

*Primary Examiner*—Vu Le
*Assistant Examiner*—Andrae S Allison
(74) *Attorney, Agent, or Firm*—Squire, Sanders & Dempsey, LLP

(57) ABSTRACT

The invention provides a face region estimating device capable of extracting a person's face region even when an illumination environment, for example, is changed and persons with different skin colors are contained in a picked-up image taken by a camera. The face region estimating device includes: a mobile body detecting unit for extracting the outline of a mobile body from the picked-up image and for generating an object distance image composed of pixels corresponding to a distance in which the mobile body exists; a head region setting unit for setting a head region based on the pixel distribution in the object distance image corresponding to a predetermined range on the basis of a pixel position at the upper part of the outline; and a face region extracting unit for extracting the person's face region from the picked-up image based on the color distribution in the picked-up image corresponding to the head region.

6 Claims, 20 Drawing Sheets

U.S. PATENT DOCUMENTS

| | | | | |
|---|---|---|---|---|
| 5,892,855 | A * | 4/1999 | Kakinami et al. | 382/291 |
| 6,088,137 | A * | 7/2000 | Tomizawa | 358/538 |
| 6,381,346 | B1 * | 4/2002 | Eraslan | 382/118 |
| 6,674,877 | B1 * | 1/2004 | Jojic et al. | 382/103 |
| 6,763,125 | B2 * | 7/2004 | Ohta | 382/104 |
| 6,920,237 | B2 * | 7/2005 | Chen et al. | 382/117 |
| 6,920,248 | B2 * | 7/2005 | Higaki | 382/199 |
| 6,940,545 | B1 * | 9/2005 | Ray et al. | 348/222.1 |
| 7,046,822 | B1 * | 5/2006 | Knoeppel et al. | 382/103 |
| 7,218,759 | B1 * | 5/2007 | Ho et al. | 382/118 |
| 7,239,726 | B2 * | 7/2007 | Li | 382/118 |
| 7,251,346 | B2 * | 7/2007 | Higaki et al. | 382/106 |
| 7,254,253 | B2 * | 8/2007 | Higaki et al. | 382/103 |
| 7,280,678 | B2 * | 10/2007 | Haven et al. | 382/117 |
| 7,324,669 | B2 * | 1/2008 | Nakanishi et al. | 382/118 |
| 7,352,880 | B2 * | 4/2008 | Kim et al. | 382/103 |
| 7,362,887 | B2 * | 4/2008 | Oohashi et al. | 382/118 |
| 7,376,250 | B2 * | 5/2008 | Higaki et al. | 382/107 |
| 7,508,979 | B2 * | 3/2009 | Comaniciu et al. | 382/154 |

FOREIGN PATENT DOCUMENTS

| | | |
|---|---|---|
| JP | 02-081590 | 3/1990 |
| JP | 07-065149 | 3/1995 |
| JP | 09-044670 | 2/1997 |
| JP | 2004-013768 | 1/2004 |
| JP | 2004-303014 | 10/2004 |

OTHER PUBLICATIONS

Adachi et al, Extraction of Face Parts by Using Flesh Color and Boundary Images, KES 2003, LNAI 2774, pp. 561-566, 2003.*

Gordon et al, Integrated Person Tracking Using Stereo, Color, and Pattern Detection, International Journal of Computer Vision 37(2), 175-185, 2000, pp. 175-186.*

Wu, H.; Yokoyama, T.; Pramadihanto, D.; Yachida, M., "Face and facial feature extraction from color image," Automatic Face and Gesture Recognition, 1996., Proceedings of the Second International Conference on , vol., No., pp. 345-350, Oct. 14-15, 1996.*

* cited by examiner

RELATIONSHIP BETWEEN AZIMUTH DIFFERENCE AND MOVING AMOUNT

OBJECT DISTANCE DETERMINATION

WHEN TILT ANGLE IS 0°

WHEN TILT ANGLE IS NOT 0°

HUE THRESHOLD VALUE SETTING

SATURATION THRESHOLD VALUE SETTING

LIGHTNESS THRESHOLD VALUE SETTING

PICKED UP IMAGE CI

FACE REGION IMAGE FI

__

FACE REGION ESTIMATING DEVICE, FACE REGION ESTIMATING METHOD, AND FACE REGION ESTIMATING PROGRAM

CROSS-REFERENCE TO RELATED APPLICATIONS

This application claims the benefit of Japanese Patent Application 2004-360772 filed on Dec. 14, 2004, the disclosure of which is incorporated herein by reference.

BACKGROUND OF THE INVENTION

1. Field of the Invention

The present invention relates to a face region estimating device, a face region estimating method, and a face region estimating program, for estimating a region of a face of a person existing on an image taken by a camera.

2. Description of the Related Art

Conventionally, a typical technique for estimating a face region (skin color region) of a person existing on an image taken by a camera such as a CCD camera was to extract from the image a region contained in a fixed range of values representing the skin color in hue, saturation and lightness (luminance) in color space to estimate the face region (skin color region).

As another technique, Japanese Published Unexamined Patent Application No. H09-44670 (Paragraphs 0011 to 0015, FIG. 1 to FIG. 3) discloses a technique for extracting a face region suited for a person's skin color as a candidate for extraction by generating the histogram of the hue value in the image and defining the hue value range of the skin color from the shape of the histogram.

As yet another technique, Japanese Published Unexamined Patent Application No. 2004-13768 (paragraphs 0020 to 0031, FIG. 1 to FIG. 8) discloses a technique for estimating that the skin color region is a person's face region by defining a skin color in a Munsell color system, extracting a skin color region from the image, comparing the skin color region with the feature amount of a preregistered individual's face to detect (identify) the face.

However, in the typical techniques for extracting from the image the region contained in the value range of hue, saturation and lightness showing a fixed skin color, it was necessary to adjust the white balance of the camera and to change the threshold of the color space (hue, saturation and lightness) whenever the illumination environment, for example, changes. That is, the technique for setting the threshold of the fixed color space had a problem of not being capable of extracting the person's face region (skin color region) because of the change in the illumination environment, for example. The technique had another problem in that it cannot simultaneously extract each person's face region when the image contained another person with a different skin color.

According to the technique disclosed in the Japanese Published Unexamined Patent Application No. H09-44670, each person's face region can be extracted by the histogram of the hue value even when the illumination environment, for example, changes and the image contains a person with a different skin color. However, because this technique detects the region having the same color distribution as the skin color, there is a problem in that the face region is erroneously detected.

The technique disclosed in the Japanese Published Unexamined Patent Application No. 2004-13768 has problems in that the image must have a high resolution to the extent the feature amount of the face can be extracted, and therefore the unit becomes expensive because of a camera having a high resolution and a high-capacity memory for memorizing the high resolution images, for example.

In view of the above-mentioned problems, it is an object of the present invention to provide a face region estimating device, a face region estimating method, and a face region estimating program capable of extracting each person's face region from an image taken by a camera without using a high resolution camera, even when the illumination environment, for example, is changed and persons of different skin colors are contained in the image.

SUMMARY OF THE INVENTION

According to a first aspect of the present invention, there is provided a face region estimating device for estimating a person's face region contained in a plurality of picked-up images from the picked-up images taken of a mobile body by a plurality of cameras, comprising;

a distance information generating unit for generating a distance to the mobile body as distance information, based on an azimuth difference of the plurality of picked-up images;

a motion information generating unit for generating motion of the mobile body as motion information, based on a difference of the picked-up images inputted in time series from at least one of the plurality of cameras;

an object distance setting unit for setting an object distance in which the mobile body exists, based on the distance information and the motion information;

an object distance image generating unit for generating an object distance image composed of pixels corresponding to the object distance, based on the distance information;

an object region setting unit for setting an object region containing the region of the mobile body, corresponding to at least the object distance set by the object distance setting unit in the object distance image;

an outline extracting unit for extracting an outline from the object region set by the object region setting unit;

a head region setting unit for setting a head region assuming the mobile body to be a person, based on a pixel distribution of the object distance image corresponding to a predetermined range on the basis of a pixel position at the upper part of the outline extracted by the outline extracting unit; and a face region extracting unit for extracting the person's face region from the picked-up image, based on the color distribution of the picked-up image corresponding to the head region set by the head region setting unit.

According to the construction, the face region estimating device uses the distance information generating unit to generate the distance to the mobile body as the distance information based on the azimuth difference of the plurality of picked-up images. For example, for pixels in which the azimuth difference is detected from the plurality of picked-up images, a distance image (distance information) is generated in which the size (the amount) of the azimuth difference is embedded for every pixel as the azimuth difference (distance) to the mobile body.

The face region estimating device uses the motion information generating unit to generate the motion of the mobile body as the motion information based on the difference of the picked-up image inputted in time series from at least one of a plurality of cameras. For example, the face region estimating device obtains the difference between two picked-up images inputted in time series, and generates a difference image obtained by setting all the pixel values other than "0" to "1", as the motion information of the mobile body.

Then, the face region estimating device uses the object distance setting unit to specify the azimuth difference (distance) having the largest motion amount by the distance information and the motion information, and sets the azimuth difference (distance) as the object distance in which the mobile body exists.

The face region estimating device uses the object distance image generating unit to extract the pixel corresponding to the object distance from the distance image (distance information) to generate the object distance image. For example, a certain width (for example, several tens of cm) is given to the object distance, and the pixel corresponding to the distance is extracted from the distance image. Further, the object region setting unit sets in the object distance image the object region in which the mobile body is to be detected, to correspond to at least the object distance. For example, in the object distance image generated with the pixels corresponding to the object distance, a region where the pixel exists is set to the object region. This allows narrowing down a region in the object distance image where the mobile body is assumed to exist. The outline extracting unit then extracts the outline of the mobile body from the object region in the object distance image.

The face region estimating device uses the head region setting unit to set the head region assuming the mobile body to be the person, based on the pixel distribution of the object distance image corresponding to the predetermined range based on the pixel position at the upper part of the outline. Thus, by setting the person's head region to the upper part of the outline, a region for estimating the face region can be narrowed down.

The face region estimating device further uses the face region extracting unit to extract a color region most distributed in the head region as a person's face region. That is, the face region estimating device assumes that a skin color is most contained in the head region and estimates that the skin color region is the person's face region. Thus, it is enabled to extract the skin color region can be even when an illumination environment, for example, changes and the image contains persons of different skin colors.

According to a second aspect of the present invention, there is provided a face region estimating device as set forth in the first aspect of the invention, further comprising an edge image generating unit for generating an edge image obtained by extracting an edge of the picked-up image based on color information or shading information of each pixel of the picked-up image, wherein the distance image generating unit extracts the pixel of the edge image corresponding to the object distance based on the distance information and generates the object distance image.

According to the construction, the face region estimating device uses the edge image generating unit to generate, from the color or shading information of the picked-up image, the edge image obtained by extracting the edge of the image. For example, based on the lightness (luminance) of the picked-up image, the face region estimating device detects as the edge a part where the lightness largely changes, to generate an edge image constructed only of the edge.

The face region estimating device then uses the object distance image generating unit to generate from the edge image, the object distance image existing within the object distance range. The edge detecting operation can thereby be omitted when the outline extracting unit extracts the outline from the object distance image.

According to a third aspect of the present invention, there is provided a face region estimating device as set forth in the first or second aspect of the invention, wherein the head region setting unit totals the pixels in a horizontal direction for every coordinate in a perpendicular direction in the predetermined range based on the pixel position at the upper part of the outline in the object distance image, and sets a range of the perpendicular direction of the head region based on the number of pixels in the horizontal direction.

According to this construction, the face region estimating device uses the head region setting unit to total the pixels in the horizontal direction in the object distance image within the predetermined range based on the pixel position at the upper part of the outline. The pixels in the object distance image existing in the horizontal direction shows a position where the mobile body exists. Then, of the pixels existing in the horizontal direction, the head region setting unit sets the top position in the perpendicular direction to the upper end of the head, and sets a position lower from the upper end by a specific length (for example, 0.3 m) to the lower end of the head. In consideration of noise, for example, the upper end of the head is preferably provided at the topmost position in the perpendicular direction where the amount of pixels in the horizontal direction is not less than a predetermined threshold value.

According to a fourth aspect of the present invention, there is provided a face region estimating device as set forth in any one of the first to third aspects of the invention, wherein the face region extracting unit includes an HLS threshold value setting unit for setting upper and lower limit values of hue, saturation, and lightness ranges in which the total of the pixels corresponding to each of the values is the largest in the predetermined range for every value of hue, saturation and lightness value in the head region, as hue, saturation, and lightness threshold values, respectively, and wherein a region composed of the pixels contained in the ranges of the hue, saturation and lightness threshold values is provided as the face region.

According to the construction, the face region estimating device uses the HLS threshold value setting unit to total the pixels for each value (hue, saturation, and lightness values) of hue, saturation and lightness of the head region in the picked-up image, and sets the upper and lower limit values in which the totaled number of pixels becomes the largest in the predetermined range to the hue, saturation, and lightness threshold values, respectively. The color region contained in the range of the hue, saturation, and lightness threshold values is most distributed in the head region. Then, the face region estimating device uses the face region extracting unit to set a region composed of the pixels contained in the range of the hue, saturation, and lightness threshold values to the face region.

Furthermore, according to a fifth aspect of the present invention, there is provided a face region estimating device as set forth in the fourth aspect of the invention, wherein the face region extracting unit includes an RGB threshold value setting unit for setting the upper and lower limit values of red, green, and blue ranges in which the total of the pixels corresponding to the concentration value is the largest in the predetermined range for every concentration value of red, green and blue, as three primary colors of light in the head region as red, green, and blue threshold values, respectively, and wherein the region composed of the pixels contained in the ranges of the red, green, and blue threshold values is set to the face region when the saturation threshold value is or below a predetermined value.

According to the construction, the face region estimating device determines that it is difficult to extract the skin color in hue, saturation and lightness if the saturation threshold value (for example, lower limit value) of the head region in the picked-up image is a predetermined value or less in the face region extracting unit, and then uses the RGB threshold value setting unit to set the range of each color (red, green, and blue ranges) most distributed from the distribution of each concentration value of red and green and blue. Thus, the skin color can be extracted in the picked-up image having low saturation.

Also, according to a sixth aspect of the present invention, there is provided a face region estimating method for estimating a person's face region contained in a plurality of picked-up images from the picked-up images taken of a mobile body by a plurality of cameras, comprising;

generating a distance to the mobile body as distance information based on an azimuth difference of the plurality of picked-up images;

generating motion of the mobile body as motion information based on the difference of the picked-up images inputted in time series from at least one of the plurality of cameras;

setting an object distance in which the mobile body exists based on the distance information and the motion information;

generating an object distance image composed of pixels corresponding to the object distance based on the distance information;

setting an object region containing the region of the mobile body, corresponding to at least the object distance set by the object distance setting unit in the object distance image;

extracting an outline from the object region set by the setting of the object region;

setting a head region assuming the mobile body to be a person, based on the pixel distribution of the object distance image corresponding to a predetermined range on the basis of a pixel position at the upper part of the outline extracted by extracting of the outline; and extracting the person's face region from the picked-up image, based on the color distribution of the picked-up image corresponding to the head region set by the setting of the head region.

Furthermore, according to a seventh aspect of the present invention, there is provided a program for allowing a computer to perform a method for estimating a person's face region contained in a plurality of picked-up images from the picked-up images taken of a mobile body by a plurality of cameras, the method comprising:

generating a distance to the mobile body as distance information based on an azimuth difference of the plurality of picked-up images;

generating motion of the mobile body as motion information based on the difference of a picked-up images inputted in time series from at least one of the plurality of cameras;

setting an object distance in which the mobile body exists based on the distance information and the motion information;

generating an object distance image composed of pixels corresponding to the object distance based on the distance information;

setting an object region containing the region of the mobile body, corresponding to at least the object distance set by the object distance setting unit in the object distance image;

extracting an outline from the object region set by the setting of the object region;

setting a head region assuming the mobile body to be a person, based on the pixel distribution of the object distance image corresponding to a predetermined range on the basis of a pixel position at the upper part of the outline extracted by extracting of the outline; and extracting the person's face region from the picked-up image, based on the color distribution of the picked-up image corresponding to the head region set by the setting of the head region.

According to the present invention, the person's face region can be extracted from the image even when an illumination environment, for example, is changed and the image contains persons of different skin colors. According to the present invention, the amount of calculation for extracting the face region can be reduced by specifying the head region, and the face region can be appropriately extracted without recognizing the region having the same color distribution as the skin color as the face.

DETAILED DESCRIPTION OF THE PREFERRED EMBODIMENTS

Hereinafter, an embodiment of the present invention will be described with reference to the drawings.

[Construction of Face Region Estimating Device]

Figure 1:
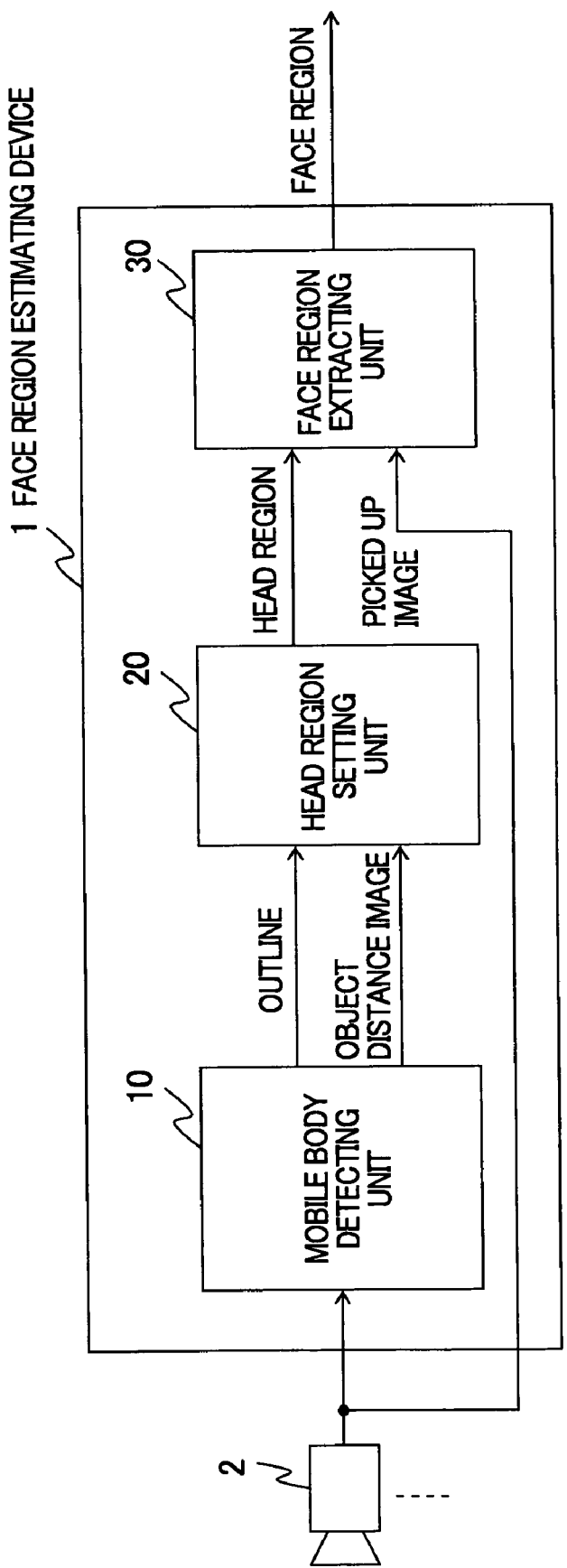
FIG. 1 is a block diagram showing an overall construction of a face region estimating device according to the present invention.

FIG. 1 is a block diagram showing an overall construction of a face region estimating device according to the present invention. As shown in FIG. 1, the face region estimating device 1 estimates a person's face region from a picked-up images taken by a plurality of cameras 2. Here, the face region estimating device 1 comprises a mobile body detecting unit 10, a head region setting unit 20 and a face region extracting unit 30.

The mobile body detecting unit 10 detects a moving mobile body from the picked-up images taken by the plurality of cameras 2. Here, the mobile body detecting unit 10 extracts the outline of the mobile body from the picked-up images, generates an object distance image composed of pixels corresponding to a distance in which the mobile body exists, and outputs the outline and the object distance image as information of the detected mobile body to the head region setting unit 20.

The head region setting unit 20 sets a head region assuming the mobile body to be the person, based on the outline of the mobile body detected by the mobile body detecting unit 10 and the object distance image. Here, the head region setting unit 20 sets the head region, assuming that the mobile body to be the person, based on the pixel distribution of the object distance image in a predetermined range based on the pixel position at the upper part (for example, the top end) of the outline. The head region set by the head region setting unit 20 is outputted to the face region extracting unit 30.

The face region extracting unit 30 assumes a color region shown by hue, saturation, and lightness most distributed in the head region set by the head region setting unit 20, as the person's face (skin color) region, and extracts the region.

Thus, the face region estimating device 1 assumes that the person's head is located in the upper part of the outline of the mobile body to specify the head region, and extracts skin color (face region) according to the color distribution of hue, saturation and lightness in the head region. Therefore, the face region estimating device 1 does not estimate a region having the same color distribution as the skin color in the picked-up image as the face region. Also, each person's face region can be extracted even when an illumination environment, for example, is changed and the image contains persons of different skin colors.

Hereinafter, the constructions of the mobile body detecting unit 10, the head region setting unit 20 and the face region extracting unit 30 will be described in detail.

<Mobile Body Detecting Unit 10>

Figure 2:
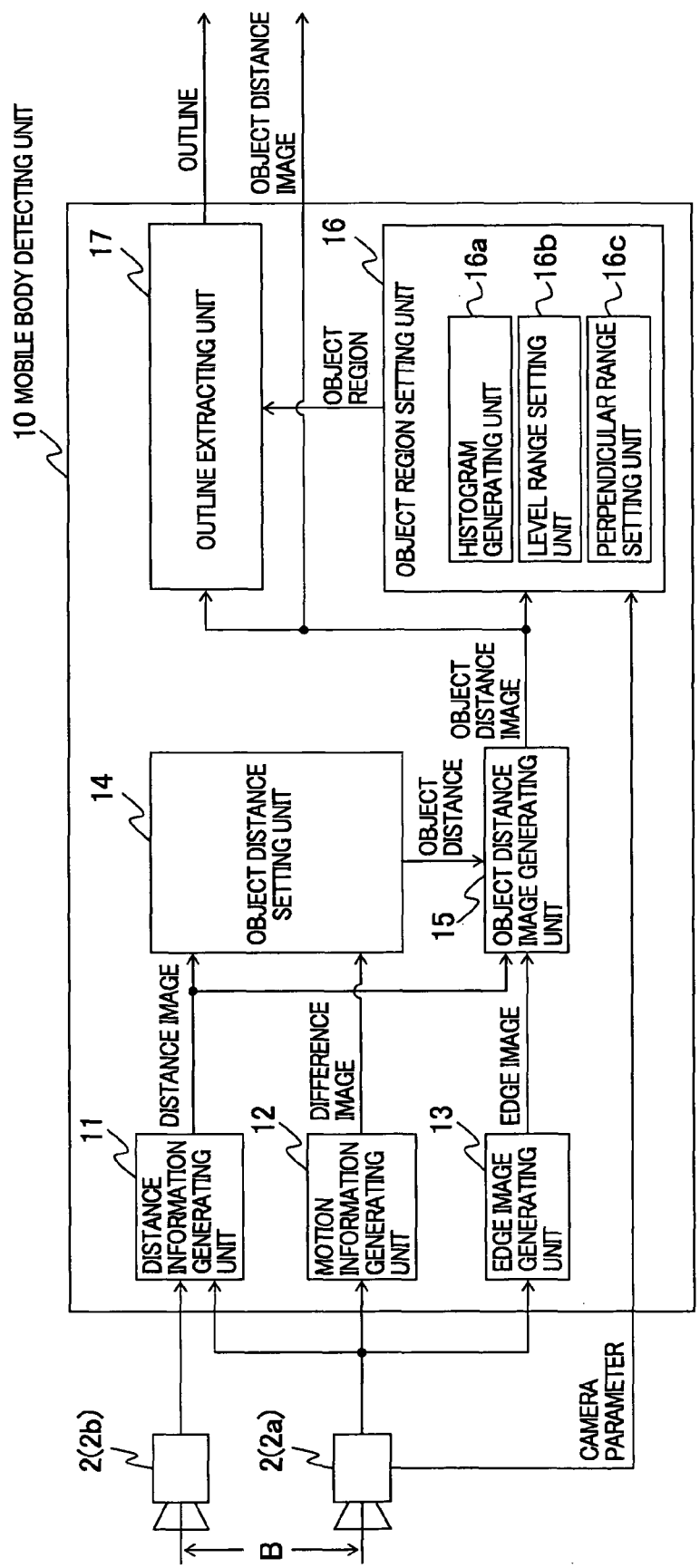
FIG. 2 is a block diagram showing a construction of a mobile body detecting unit contained in a face region estimating device according to the present invention.

First, with reference to FIG. 2, the construction of the mobile body detecting unit 10 will be described. FIG. 2 is a block diagram showing a construction of a mobile body detecting unit contained in the face region estimating device according to the present invention. As shown in FIG. 2, the mobile body detecting unit 10 detects a moving object (mobile body) from the picked-up images taken by the two cameras 2. The cameras 2 are separated and arranged by a distance B to the right and left sides, and are used as a right camera 2a and a left camera 2b, respectively. Here, the mobile body detecting unit 10 includes a distance information generating unit 11, a motion information generating unit 12, an edge image generating unit 13, an object distance setting unit 14, an object distance image generating unit 15, an object region setting unit 16 and an outline extracting unit 17.

The distance information generating unit 11 generates the distance image in which the azimuth difference between the two picked-up images taken by the right and left cameras 2a, 2b at the same time is embedded as the distance information from the cameras 2 (more precisely, the focal position of the cameras 2) to the picked-up object. The distance information generating unit 11 inputs the picked-up image, for example, at a rate of one frame at 100 ms intervals.

The distance information generating unit 11 uses the right camera 2a as a standard camera, and performs block matching with a block (for example, 8×3 pixels) having a specific size by using the standard picked-up image taken by the standard camera (right camera 2a) and the picked-up image taken at the same time by the left camera 2b, to measure the azimuth difference from the standard picked-up image. The distance information generating unit 11 generates the distance image in which the size of the azimuth difference (azimuth difference amount) corresponds to each pixel in the standard picked-up image.

When the azimuth difference, the focal distance of the camera 2 (not shown), and the distance between the right and left cameras 2a, 2b are set to Z, f and B, respectively, the distance L (not shown) between the camera 2 and the object, corresponding to the azimuth difference Z, can be calculated by the formula (1).

$$L = B \times f / Z \tag{1}$$

The motion information generating unit 12 generates the difference image obtained by embedding the motion of the mobile body in the picked-up image as the motion information based on the difference between the two picked-up images taken in time series by the standard camera (right camera 2a).

The motion information generating unit 12 uses the right camera 2a as the standard camera, and obtains the difference between the two picked-up images taken by the standard camera (right camera 2a) at different times. For example, when the picked-up images are inputted at an interval of 100 ms, the picked-up image delaying by Δt (for example, 33 ms) from the input time is inputted, and the difference between the two picked-up images is obtained.

Then, the difference image is generated in which the pixels having the difference are given a pixel value "1" as the pixel having the motion, and the pixels having no difference are given a pixel value "0" as the pixel having no motion. The motion information generating unit 12 further performs a filtering processing with a median filter, for example, on the difference image to remove noise therefrom.

When the camera 2 is moving cameras mounted on a robot or a vehicle, for example, and the background of the picked-up image changes, the amount of camera movement such as pan and tilt is inputted for every picked-up image from the camera 2. Then, for example, by correcting the picked-up image at time t+Δt by the camera movement amount, only the moving pixels between times t and t+Δt are detected.

The edge image generating unit 13 inputs the (standard) picked-up image from the camera 2 (2a), and extracts the edge from the image to generate the edge image. This edge image generating unit 13 detects as the edge a part with a large change in lightness, based on the lightness (luminance: shading information) of the picked-up image inputted from the camera 2 (2a), and generates the edge image composed only of the edge. For example, the edge is detected by multiplying operators (coefficient line: Sobel operator, Kirsch operator, for example) having a weighting coefficient to the pixel in the vicinity region of a certain pixel for every pixel.

Figure 11:
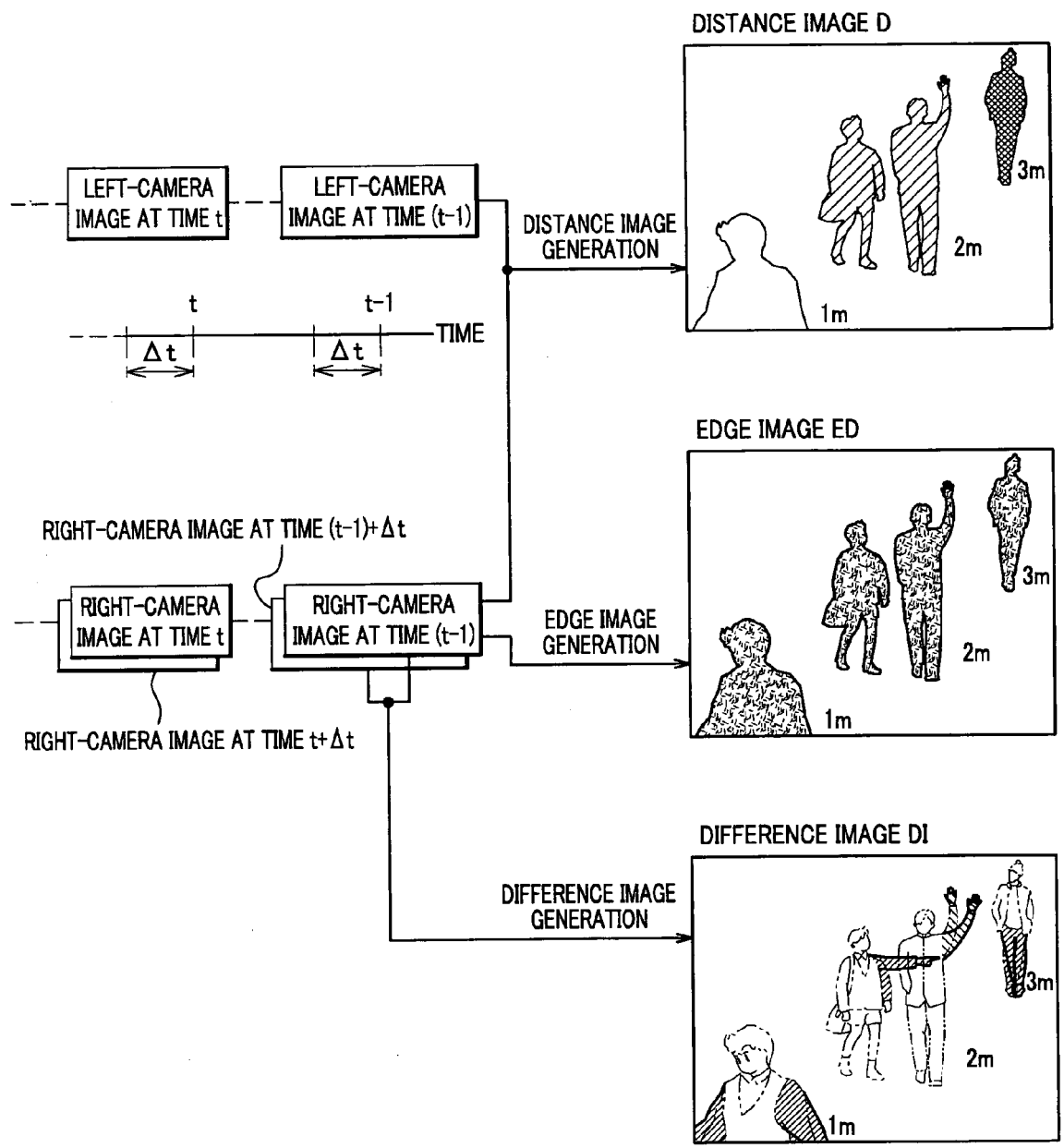
FIG. 11 is a drawing showing an example of the contents of distance, edge, and difference images.

Now, with reference to FIG. 11 (to FIG. 2 appropriately), the distance, difference, and edge images respectively generated by the distance information generating unit 11, the motion information generating unit 12, and the edge image generating unit 13 will be described. FIG. 11 shows the images being generated based on the picked-up images inputted in a time series.

As shown in FIG. 11, the distance image D is generated by expressing in a pixel value the azimuth difference between the picked-up image of the right camera (right camera image) and the picked-up image of the left camera (left camera image), both taken at the same time. The larger and smaller values of the azimuth difference expresses that the person's position is nearer to and farther from the camera 2, respectively. The edge image ED is an image generated from the right camera image, and is an image composed only of the detected edge. The difference image DI is generated by obtaining a difference between two right camera images differing in the input time only by Δt (for example, images at times t and t+Δt), and expressing the pixels having the difference as the pixel value "1" and the pixels having no difference as the pixel value "0." The pixels with the difference express a region in which the person actually moves.

Figure 12A:
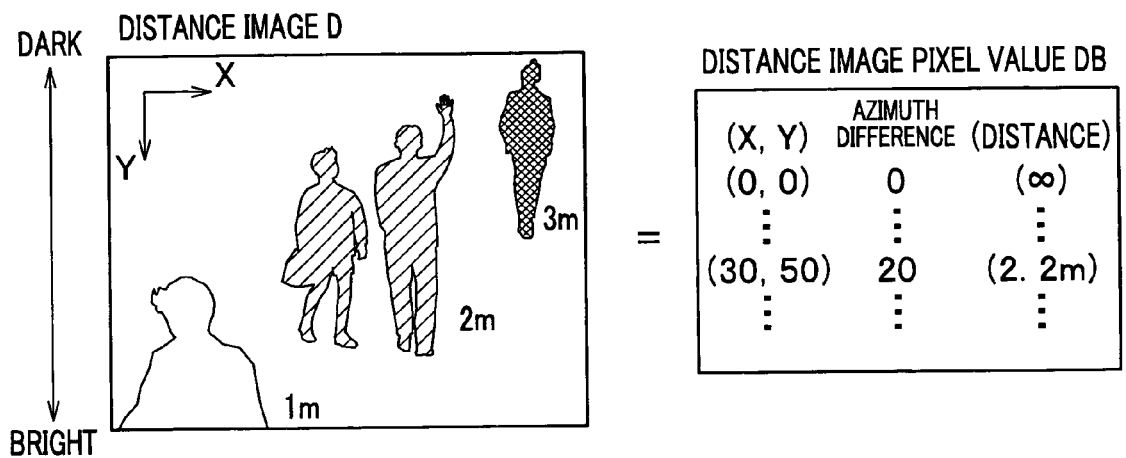
FIG. 12A is a drawing showing an example of the contents of a distance image.
Figure 12B:
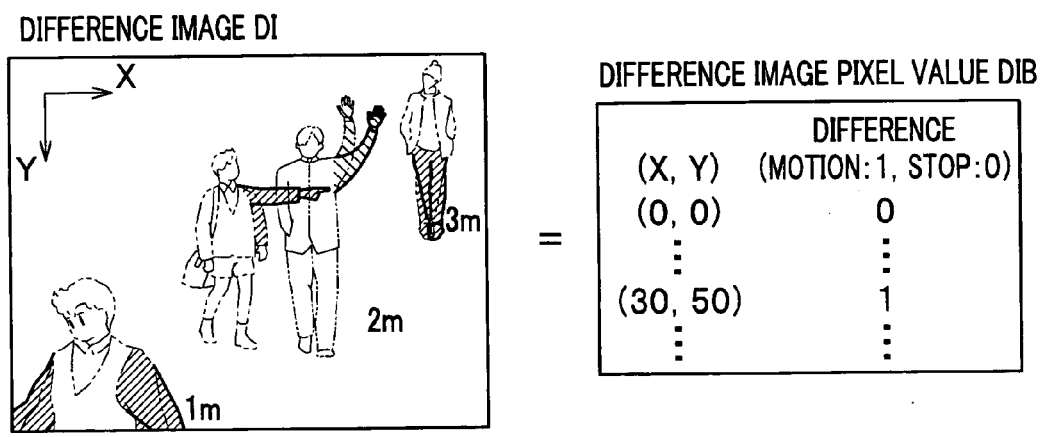
FIG. 12B is a drawing showing an example of the contents of a difference image.

Here, with reference to FIGS. 12A and 12B, the contents of the distance image D and the difference image DI will be described in further detail. FIG. 12A shows an example of the image content and pixel values (distance image pixel value DB) of the distance image D. FIG. 12B shows an example of the image content of the difference image DI and pixel values (difference image pixel value DIB) of the distance image DI. Here, it is considered that the person exists at positions about 1 m, 2 m and 3 m away from the cameras 2.

As shown in FIG. 12A, the distance image D is obtained by expressing in the pixel value the azimuth difference between the right and left camera images taken at the same time. For example, as shown in the distance image pixel value DB, the pixel position (0, 0) of the distance image D has the azimuth difference which is 0 and the infinity (∞) distance from the camera 2. Also, the pixel position (30, 50) of the distance image D means the azimuth difference is 20, and the distance from the camera 2 is, for example, 2.2 m corresponding to the azimuth difference of 20. Thus, with the distance image D expressing the azimuth difference as the pixel value, the nearer and farther the object is to and from the camera 2, the brighter and darker the image becomes, respectively, for example.

As shown in FIG. 12B, the difference image DI expresses whether or not the right camera images inputted in time series have any difference therebetween. For example, as shown in the difference image pixel value DIB, the pixel position (0, 0) of the difference image DI has the difference value of "0" which means "stop" or no motion. The pixel position (30, 50) of the difference image DI has the difference value of "1" or "motion."

Now, referring back to FIG. 2, the object distance setting unit 14 specifies the mobile body having the largest motion amount, based on the distance image and the difference image generated by the distance information generating unit 11 and the motion information generating unit 12, respectively, and sets the object distance in which the object mobile body exists. This object distance is outputted to the object distance image generating unit 15.

This object distance setting unit 14 totals the pixel values of the difference image located in the same position as the pixels corresponding to the azimuth difference for every azimuth difference (distance) expressed by the distance image (totals the number of pixels for every azimuth difference because the pixel with motion has a pixel value "1"), and determines that the mobile body with the largest motion amount exists in the azimuth difference in which the total is the largest (hereinafter referred to as the "largest azimuth difference"). For example, the total is calculated for every azimuth difference in that, for example, the azimuth differences (distances) from 1.0 m to 1.1 m and 1.1 m to 1.2 m has a total of 110 and 92 pixel values, respectively, and the azimuth difference (distance) having the largest total is set to the largest azimuth difference.

Here, the distance range in which the mobile body with the largest motion amount exists is provided as "the depth of the object distance corresponding to the largest azimuth difference"±α. The value α shows the range of the depth direction on the basis of the object distance, and is provided as the difference between the distance images inputted in time series from the distance information generating unit 11, for example, the difference between the distance images generated at times t-1 and t. The value α may be provides as a fixed value of several tens of centimeters assuming that the person is to be detected.

This object distance setting unit 14 memorizes in a memory unit such as a memory (not shown) the distance image and the difference image generated by the distance information generating unit 11 and the motion information generating unit 12, respectively.

The object distance image generating unit 15 generates the object distance image obtained by extracting the pixel corresponding to the object distance set by the object distance setting unit 14 from the edge image generated by the edge image generating unit 13 based on the distance image in which is embedded the amount of azimuth difference generated by the distance information generating unit 11.

For example, when the distance L between the camera 2 and the mobile body, corresponding to the largest azimuth difference, is calculated by the above formula (1), the range Zr of the azimuth difference is given as formula (2) below which is a transformation of the formula (1), wherein f, B and α are the focal distance of the camera 2, the distance f between the right and left cameras 2a, 2b, and the range of the object in the depth direction, respectively.

$$B \times f/(L+\alpha) < Zr < B \times f/(L-\alpha) \quad (2)$$

This object distance image generating unit 15 generates the object distance image obtained by extracting from the edge image the pixels corresponding to the azimuth difference of the range of the formula (2).

Figure 13A:
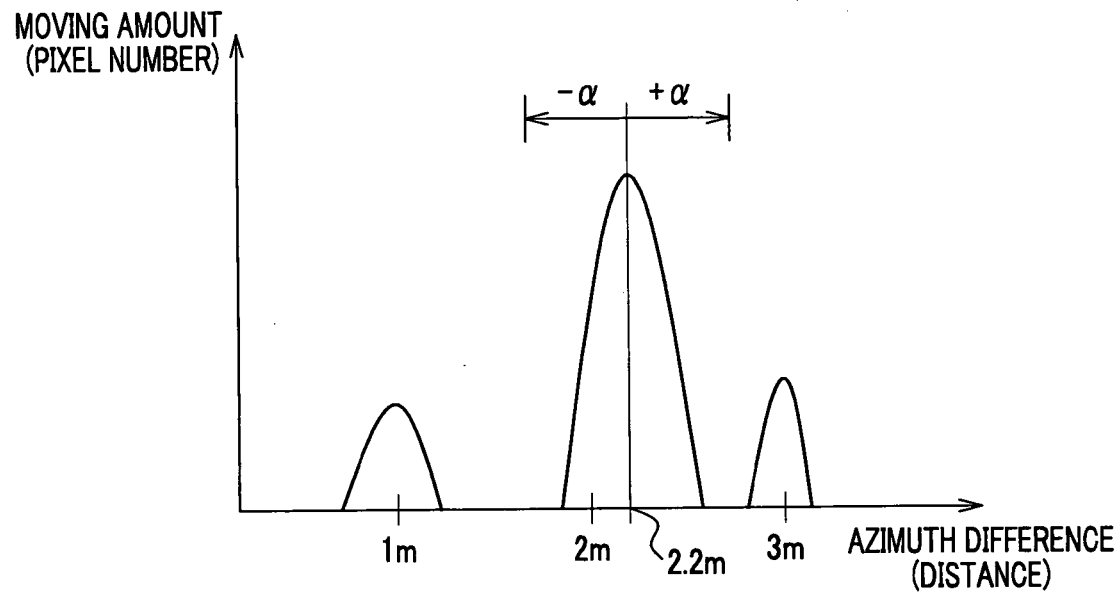
FIG. 13A is an illustration of the motion amount (pixel value) of every azimuth difference (distance).
Figure 13B:
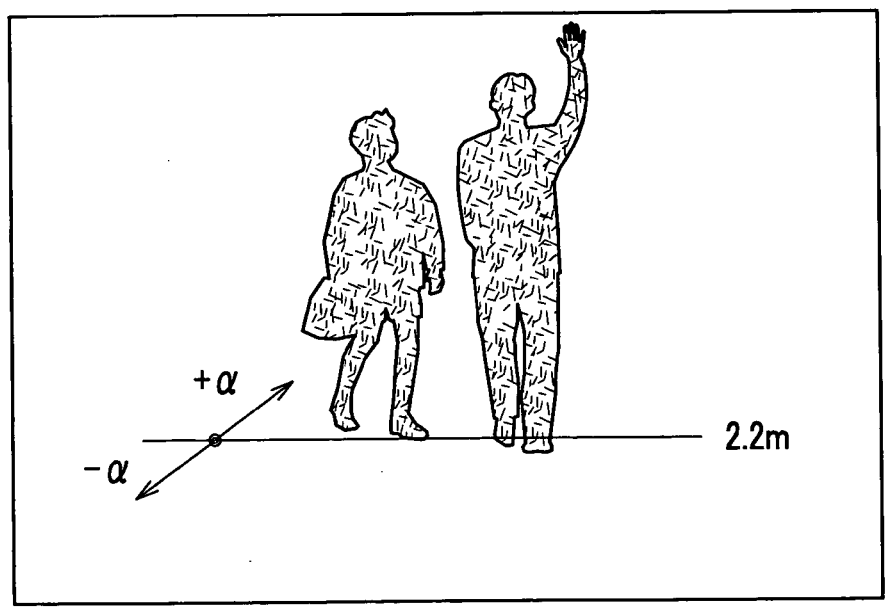
FIG. 13B is an illustration of a procedure for generating an object distance image based on the motion amount (pixel value) of every azimuth difference (distance) shown in FIG. 13A.

The object distance image may be generated by extracting only those pixels in the pixel position corresponding to the object distance (the azimuth difference range) from the picked-up image (original image) taken by the standard camera (right camera 2a) or the distance image generated by the distance information generating unit 11, Here, with reference to FIGS. 13A, 13B (to FIG. 2 appropriately), will be described a procedure in which the object distance setting unit 14 and the object distance image generating unit 15 generate the image (object distance image) corresponding to the distance in which exists the mobile body as an object to be detected. FIG. 13A shows the relationship between the azimuth difference (distance) and the motion amount (pixel number) obtained by totaling the moving pixels based on the distance image D and the difference image DI (FIG. 12). FIG. 13B shows the object distance image TD obtained by extracting only the image of the object distance from the edge image ED (FIG. 11).

As shown in FIG. 13A, the relationship between the azimuth difference (distance) and the motion amount (pixel number) of the distance image D (FIG. 12A) is graphed to show the motion amount has peaks at the azimuth differences (distances) of 1 m, 2.2 m and 3 m. Then, the object distance setting unit 14 considers that the mobile body exists at the azimuth difference (2.2 m) having the greatest motion amount, and determines that the mobile body exists in the depth range before or after (±α) the azimuth difference (2.2 m). The value α is the difference between the distance images inputted in time series from the distance information generating unit 11. The value α may be provided such that the person, who is assumed to be the mobile body, exists in the range of 2.2±α (α=0.5 m) from the camera 2.

As shown in FIG. 13B, the object distance image generating unit 15 determines the object pixel position from the edge image generated by the edge image generating unit 13 based on the distance image generated by the distance information generating unit 11, and then generates the object distance image TD obtained by extracting the pixels existing in the object distance ±α m. This allows deleting the images of persons existing 1 m and 3 m from the camera 2, and thus generating the object distance image TD obtained by extracting as the edge image only the person existing in a position 2.2±α m from the camera 2.

Referring back to FIG. 2, the object region setting unit 16 totals the number of pixels in the perpendicular direction of the object distance image (edge image corresponding to object distance) generated by the object distance image generating unit 15, specifies the position with the largest total number of pixels in the perpendicular direction as a level position at the center of the mobile body, and then sets the region containing the mobile body as the object region. Here, the object region setting unit 16 includes a histogram generating unit 16a, a level range setting unit 16b and a perpendicular range setting unit 16c.

The histogram generating unit 16a measures and totals the number of pixels in the perpendicular direction of the object distance image. Here, the histogram generating unit 16a generates the histogram by totaling the number of pixels measured in the perpendicular direction, and thus allowing determining that the level position at the center of the mobile body exists where the histogram is largest. The histogram generating unit 16a performs a smoothing processing to the histogram.

The level range setting unit 16b sets the range of the horizontal direction of the region (object region) including one mobile body and being the object for extracting the outline of the mobile body, based on the histogram generated by the histogram generating unit 16a. The level range setting unit 16b uses the histogram (smoothed) generated by the histogram generating unit 16a to set a prescribed range from the level position with the largest number of pixels, as the horizontal direction range for the mobile body.

Figure 14:
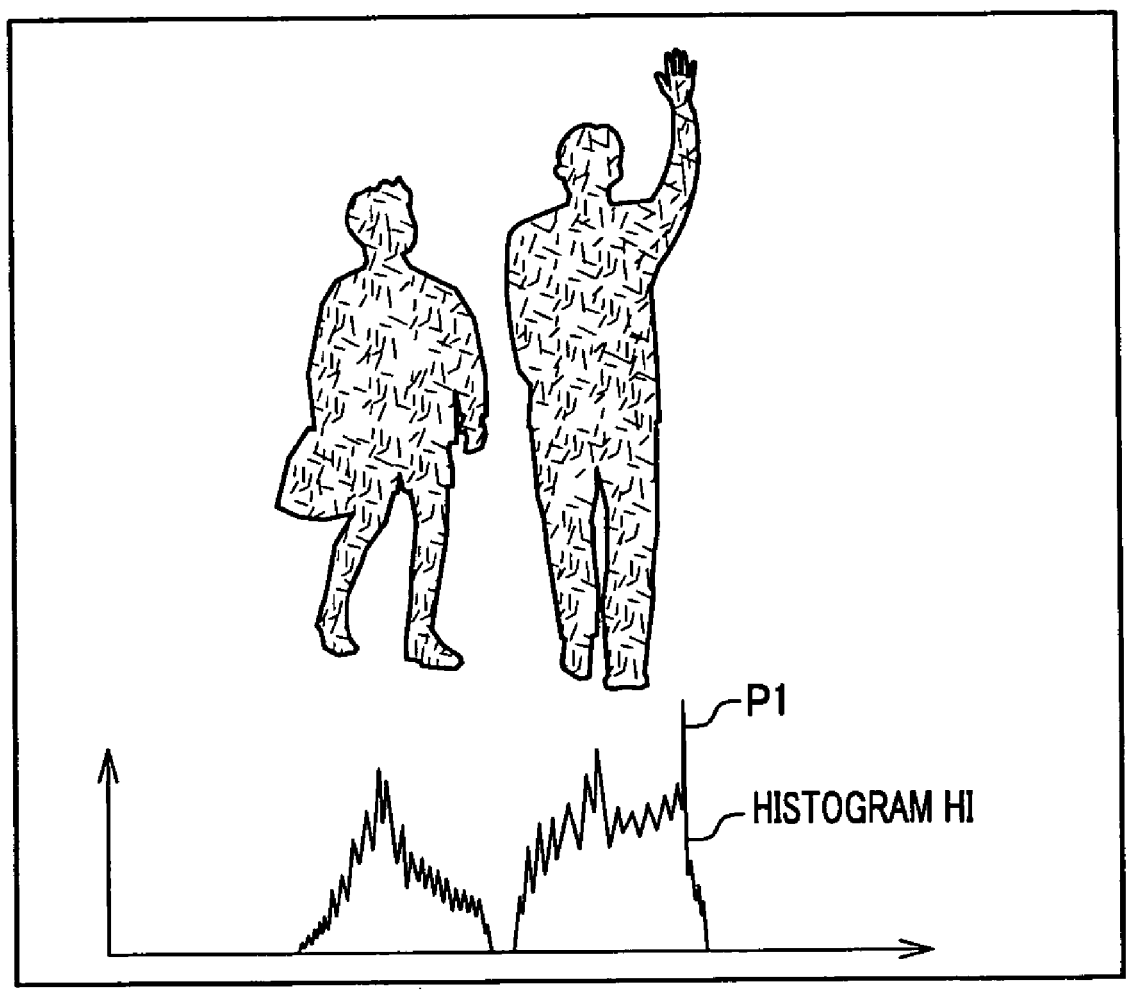
FIG. 14 is a drawing expressing in a histogram the total obtained by measuring the number of pixels in the perpendicular direction for every coordinate in the horizontal direction in the object distance image.
Figure 15A:
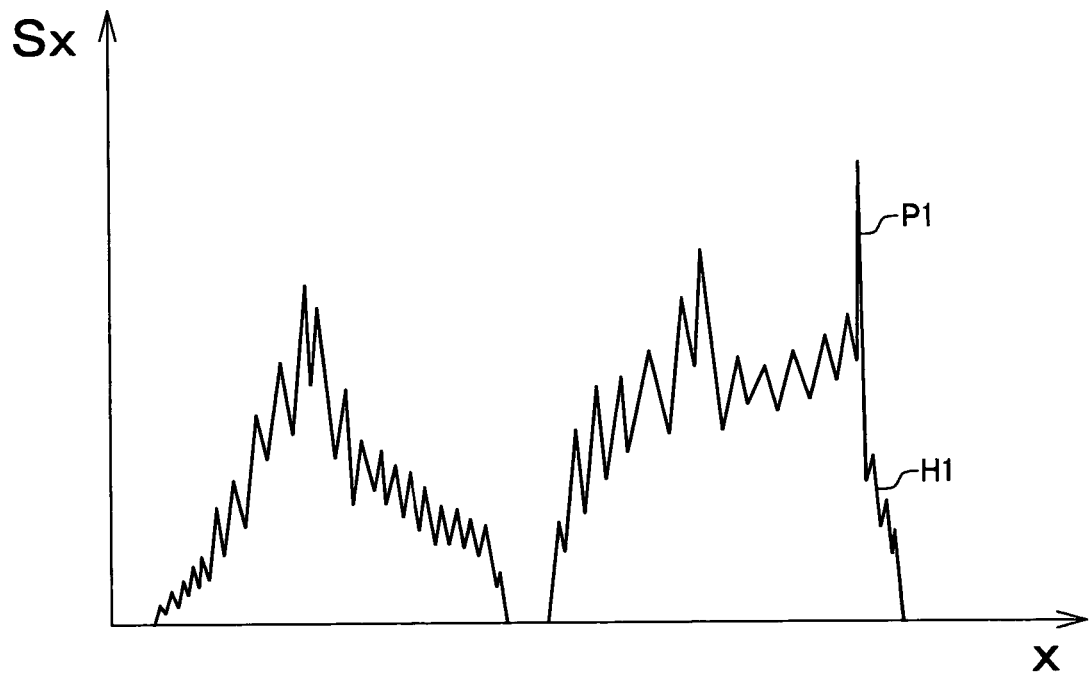
FIG. 15A is a drawing showing an example of a histogram before smoothing processing.
Figure 15B:
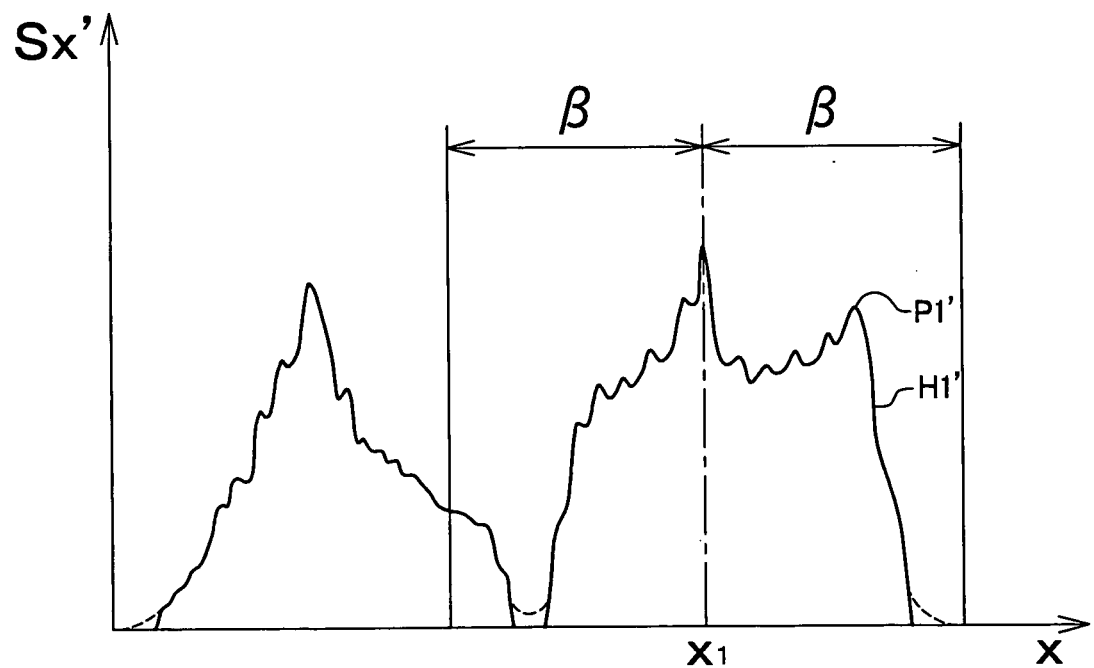
FIG. 15B is a drawing showing an example of a histogram after smoothing processing.

Here, with reference to FIG. 14 and FIGS. 15A, 15B (to FIG. 1 appropriately) will be described a procedure in which the object region setting unit 16 sets the horizontal direction range in the region (object region) of one mobile body (one person) in the object distance image TD. FIG. 14 expresses in the histogram the total obtained by measuring the number of pixels in the perpendicular direction for every coordinate in the horizontal direction in the object distance image. It is to be noted that the histogram HI is overlapped with the object distance image TD in FIG. 14, only for convenience of description. FIGS. 15A and 15B are drawings to respectively show an example of a histogram before and after a smoothing processing.

First, as shown in FIG. 14, the histogram generating unit 16a measures and totals the number of pixels in the perpendicular direction for every coordinate in the horizontal direction, to generate the histogram HI in which the number of pixels was totaled for every coordinate in the horizontal direction in the region in which the mobile body contained in the object distance image TD exists. In the histogram HI of FIG. 14, the peak P1 appears locally.

The histogram generating unit 16a performs a smoothing processing to the histogram HI, as shown in FIGS. 15A, 15B.

Specifically, the smoothing is performed using the following formula (3), wherein Sx, Sx' and xo are provided as the number of pixels in the coordinate x noted in the histogram HI, the number of pixels in the coordinate x of the histogram HI' after smoothing, and a positive constant, respectively.

$$S'_\chi = \sum_{n=\chi-\chi_0}^{\chi-1} \frac{S_n}{f(n)} + S_\chi + \sum_{n=\chi+1}^{\chi+\chi_0} \frac{S_n}{f(n)} \quad (3)$$

Where, f(n) which is a function of n may be a constant. When f(n) is equal to |x⁻n| as shown in the following formula (4), the histogram HI' after smoothing can be generated with the feature of the original histogram HI' left, because the number Sn of pixels is treated more heavily in the coordinate n nearer from the coordinate X in distance (coordinate).

$$S'_\chi = \sum_{n=\chi-\chi_0}^{\chi-1} \frac{S_n}{|\chi-n|} + S_\chi + \sum_{n=\chi+1}^{\chi+\chi_0} \frac{S_n}{|\chi-n|} \quad (4)$$

This processing can change the histogram HI as shown in FIG. 15A into a smoothed histogram HI' as shown in FIG. 15B, with the peak P1 that appeared locally in the histogram HI becomes as low as peak P1'.

The smoothing processing with the above formula (3) or (4) is preferably provided with the following formula (5) as a condition.

$$\text{If } \sum_{n=x-x_0}^{x-1} S_n = 0 \text{ or } \sum_{n=x+1}^{x+x_0} S_n = 0, \text{ then } S'_x = 0 \quad (5)$$

According to the condition of the formula (5), if the number of pixels Sx of the histogram HI is all "0" on the right side (where x is larger) or left side (where x is smaller) of the noted coordinates x, then the number of pixels Sx' after smoothing is set to "0", and thus the bottom of the right and left ends of Histogram HI can be prevented from spreading. That is, the ends are shaped as shown with a solid line, instead of spreading as the broken line in FIG. 15B, for example.

The can prevent adjacent person's histograms HI from being connected because of the smoothing processing.

The level range setting unit 16b sets the range in the horizontal direction containing one mobile body, based on the histogram generated by the histogram generating unit 16a.

Specifically, the coordinate x (e.g., x1 in FIG. 15B) with the largest number of pixels Sx' in the histogram HI' after smoothing as described in FIG. 15B is provided as the central position of one mobile body, and then a fixed range (e.g., β in FIG. 15B) is set on both right and left sides of the position as the range in the horizontal direction of the object region. This β may have the number of pixels equivalent to or slightly larger than the person's width to take into consideration the case in which the person raises the hand. Further, the level position (coordinate x) where the histogram is the lowest is detected in the range, and then set as one person's right and left ends.

When setting the range in the horizontal direction for extracting the mobile body, it is preferable to take the moving direction of the mobile body into consideration. For example, the level range setting unit 16b obtains the move vector of the mobile body based on the central position of the mobile body obtained by the histogram generated from the object distance image at time t-2 and the central position of the mobile body obtained by the histogram generated from the object distance image at time t-1. When the angle between the move vector and visual line direction of the camera 2 is less than 45°, for example, the central position ±(0.5 to 0.6)m is set to the level range for detecting the person. When the angle between the move vector and visual line direction of the camera 2 is 45° or more, for example, the central position ±(0.2 to 0.3)m is set to the level range for detecting the person. This is because it is considered that the person crosses in front of the camera 2 when the angle is 45° or more.

The range in the horizontal direction of the object region, although not shown, may be set by obtaining the number of level pixels αhd H on the object distance image by the formula (6) when half (distance from the center of the mobile body) of the width of the object region is set to 0.5 (m), wherein the field angle of the camera 2, the distance to the mobile body as the object from the camera 2, and the resolution of the transverse direction of the object distance image are set to $\theta_h$, L and X, respectively, for example.

$$\alpha_H = (X/\theta_h)\tan^{-1}(0.5/L) \quad (6)$$

Referring back to FIG. 2, the description will be continued.

The perpendicular range setting unit 16c sets the range in the perpendicular direction of the region (object region) as the object for extracting the outline of the mobile body. Here, the perpendicular range setting unit 16c sets a specific length (for example, 2 m) to the range in the perpendicular direction of the object region.

Figure 16A:
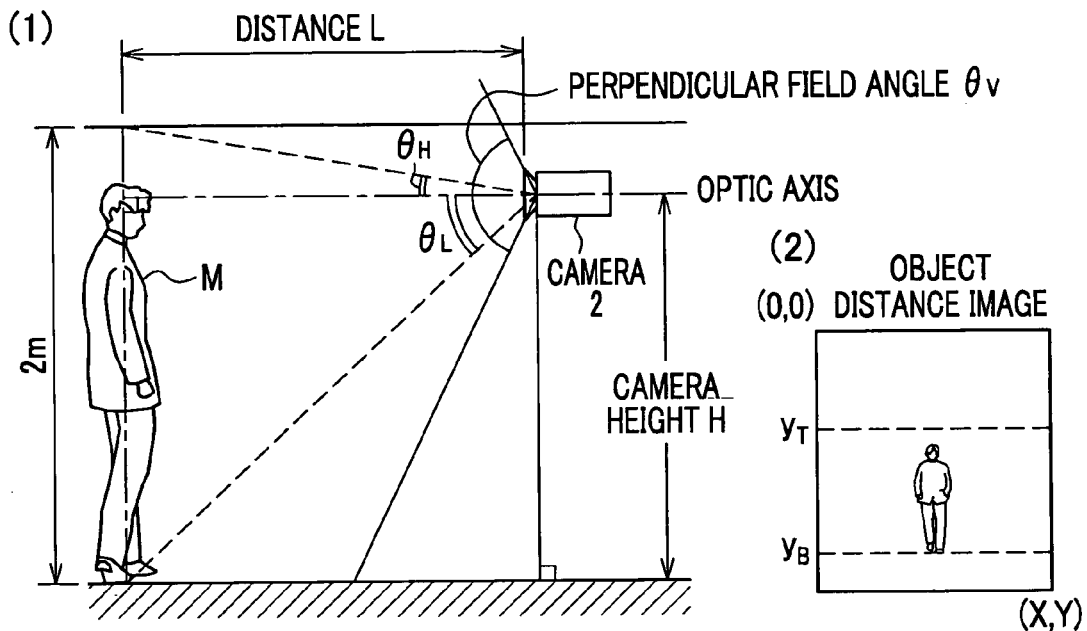
FIG. 16A is an illustration for describing a procedure for calculating at what height the mobile body is located on the object distance image, in which the tilt angle is 0 (°).
Figure 16B:
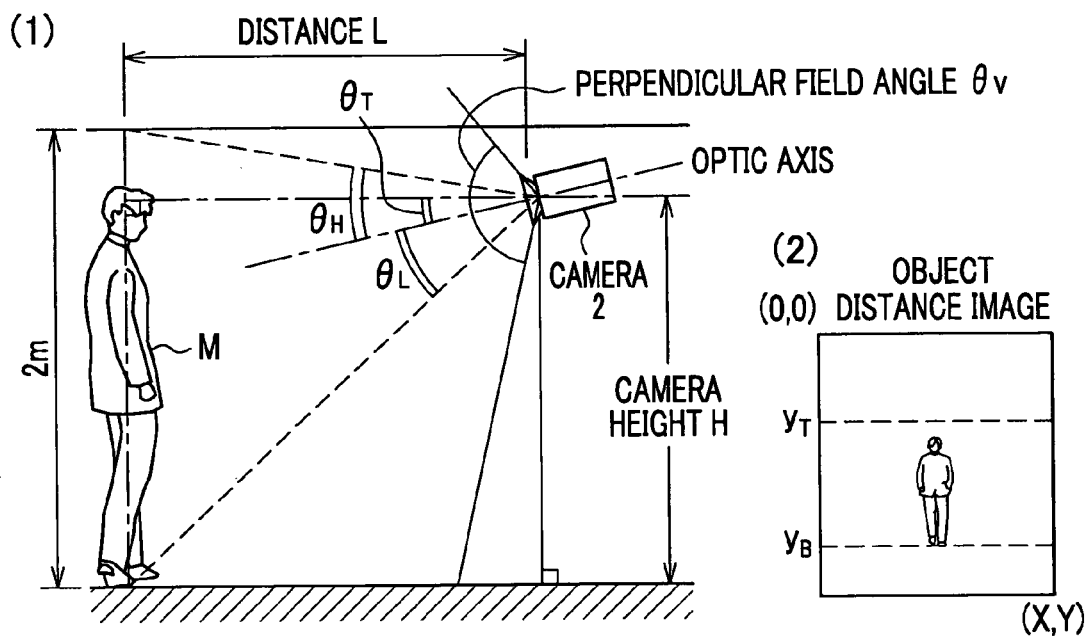
FIG. 16B is an illustration for describing a procedure for calculating at what height the mobile body is located on the object distance image, in which the tilt angle is not 0 (°).

With reference to FIGS. 16A, 16B (to FIG. 2 appropriately), a procedure will be described in which the object region setting unit 16 (perpendicular range setting unit 16c) sets the range in the perpendicular direction in the region (object region) of one mobile body (one person) in the object distance image. FIGS. 16A, 16B are illustrations of a procedure for calculating at what height the mobile body is located on the object distance image. FIGS. 16A, 16B each show a height in which the mobile body M is located on the object distance image when the camera 2 is built into a moving robot (not shown) and is located at a certain height (camera amount) H from the same floor as the mobile body M. FIG. 16A shows the correspondence relationship between the camera 2 and mobile body M when the tilt angle of the camera 2 is 0 (°). FIG. 16B shows the correspondence relationship when the tilt angle of the camera 2 is $\theta_T$ (≠0).

First will be described, with reference to FIG. 16A, a method for specifying a position in the perpendicular direction on the object distance image (2) in which the mobile body M exists when the tilt angle is 0 (°).

Here, the perpendicular field angle of the camera 2, the distance between the camera 2 and the mobile body M, the resolution in the perpendicular direction of the object distance image, the height (camera height) of the camera 2 from the floor, and the virtual height of the mobile body M from the floor are respectively set to $\theta_v$, L, Y, H and 2 (m). At this time, the angle $\theta_H$ between the optic axis of the camera 2 and a straight line connecting the camera 2 to the virtual upper end (2 m from the floor) of a mobile body M can be expressed by the following formula (7).

$$\theta_H = \tan^{-1}((2-H)/L) \quad (7)$$

Thereby, the upper end $y_T$ on the object distance image (2) of the mobile body M can be calculated by the following formula (8).

$$y_T = Y/2 - \theta_H Y/\theta_v \quad (8)$$
$$= Y/2 - (Y/\theta_v)\tan^{-1}((2-H)/L)$$

The angle $\theta_L$ between the optic axis of the camera 2 and the straight line connecting between the camera 2 and the lower end (floor) of the mobile body M can be expressed by the following formula (9).

$$\theta_L = \tan^{-1}(H/L) \quad (9)$$

Thereby, the lower end $y_B$ on the object distance image (2) of the mobile body M can be calculated by the following formula (10).

$$y_B = Y/2 + \theta_L Y/\theta_v \quad (10)$$
$$= Y/2 + (Y/\theta_v)\tan^{-1}(H/L)$$

Next will be described, with reference to FIG. 16B, a method for specifying the position in the perpendicular direction on an object distance image (2) where the mobile body M exists when the tilt angle is $\theta_T$ (≠0).

Here, the perpendicular field angle of the camera 2, the tilt angle, the distance to the mobile body M, the resolution in the perpendicular direction of the object distance image, the height (camera height) of the camera 2 from the floor and the virtual height of the mobile body M from the floor are set to $\theta_V$, $\theta_T$, L, Y, H and 2 (m), respectively. The difference angle ($\theta_H$-$\theta_T$) of the angle $\theta_H$ between the optic axis of the camera 2 and the straight line connecting the virtual upper end (2 m from the floor) of the mobile body M to the camera 2, and tilt angle $\theta_T$ can be expressed by the following formula (11).

$$\theta_H - \theta_T = \tan^{-1}((2-H)/L) \quad (11)$$

Thereby, the upper end $y_T$ on the object distance image (2) of the mobile body M can be calculated by the following formula (12).

$$y_T = Y/2 - \theta_T Y/\theta_v - (\theta_H - \theta_T)Y/\theta_v \quad (12)$$
$$= Y/2 - \theta_T Y/\theta_v - (Y/\theta_v)\tan^{-1}((2-H)/L)$$

The addition angle ($\theta_L$+$\theta_T$) of the angle $\theta_L$ between the optic axis of the camera 2 and the straight line connecting the lower end (floor) of the mobile body M to the camera 2 and tilt angle $\theta_T$ can be expressed by the following formula (13).

$$\theta_L + \theta_T = \tan^{-1}(H/L) \quad (13)$$

Thereby, the lower end $y_B$ on the object distance image (2) of the mobile body M can be calculated by the following formula (14).

$$y_B = Y/2 - \theta_T Y/\theta_v + (\theta_L + \theta_T)Y/\theta_v \quad (14)$$
$$= Y/2 - \theta_T Y/\theta_v + (Y/\theta_v)\tan^{-1}(H/L)$$

The range in the perpendicular direction of the object region is set by upper end $y_T$ and lower end $y_B$ of the object distance images (2) thus calculated.

When the moving robot (not shown) goes up-and-down stairs, for example, and does not exist on the same floor as the mobile body M, an encoder, for example, of the moving robot body can detect the rising and falling amount, and the position in the perpendicular direction in the object distance image (2) of the mobile body M can be specified by adding or subtracting the rising and falling amount to the height of the mobile body M from the floor. The height of the floor specified by the direction and distance of the mobile body M may be acquired from the map information stored in the moving robot in advance.

Referring back to FIG. 2, the outline extracting unit 17 extracts the outline of the mobile body by using a known outline extraction technique in the object distance image generated by the object distance image generating unit 15 in the region (object region) of the mobile body set by the object region setting unit 16.

As the known outline extraction, a dynamic outline model referred to as SNAKES, for example, can be used. SNAKES is a technique for extracting the objective outline by contracting and modifying a closed curve so as to minimize the energy previously defined. Here, the amount of calculation for outline extraction can be reduced, because the initial value for calculating energy can be set in the region (object region) of the mobile body.

Figure 17:
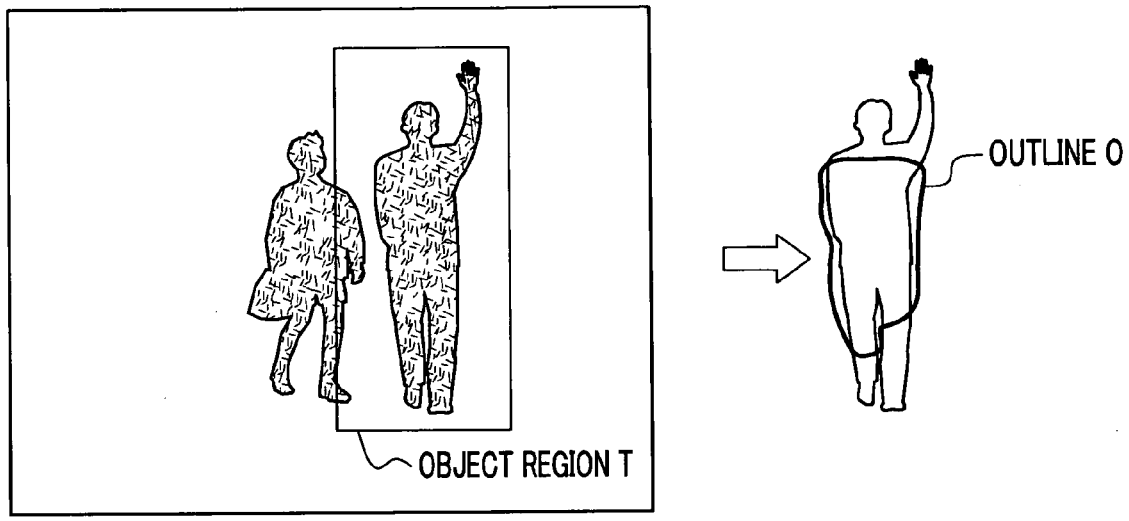
FIG. 17 is a drawing showing an example of extracting an outline of the object region in an object distance image.

This outline extracting unit 17 outputs the extracted outline (outline information) to the head region setting unit 20 (refer to FIG. 1). Thereby, the outline O can be extracted in the object region T where the mobile body is limited to one (one person) in the object distance image TD, and the outlined position of the mobile body can be specified, as shown in FIG. 17, for example.

<Head Region Setting Unit 20>

Figure 3:
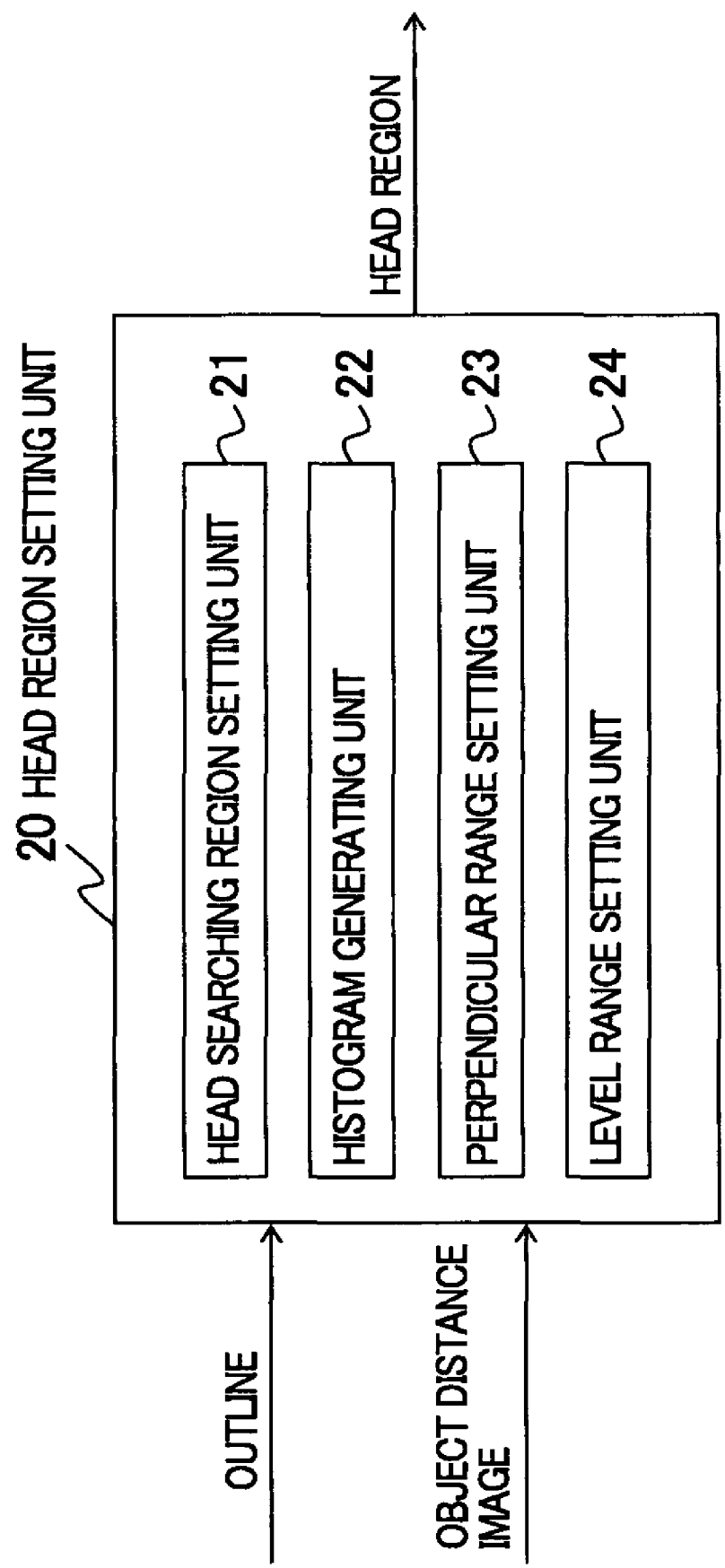
FIG. 3 is a block diagram showing a construction of a head region setting unit contained in a face region estimating device according to the present invention.

Next, with reference to FIG. 3, the construction of the head region setting unit 20 will be described. FIG. 3 is a block diagram showing a construction of a head region setting unit contained in the face region estimating device according to the present invention. As shown in FIG. 3, the head region setting unit 20 sets the head region when assuming the mobile body to be the person based on the outline of the mobile body detected by the mobile body detecting unit 10 and the object distance image (refer to FIG. 1). Here, the head region setting unit 20 comprises a head searching region setting unit 21, a histogram generating unit 22, a perpendicular range setting unit 23 and a level range setting unit 24.

The head searching region setting unit 21 sets the region of the predetermined range as the region for searching for the person's head (head searching region) on the basis of the pixel position at the upper part of the outline.

Figure 18:
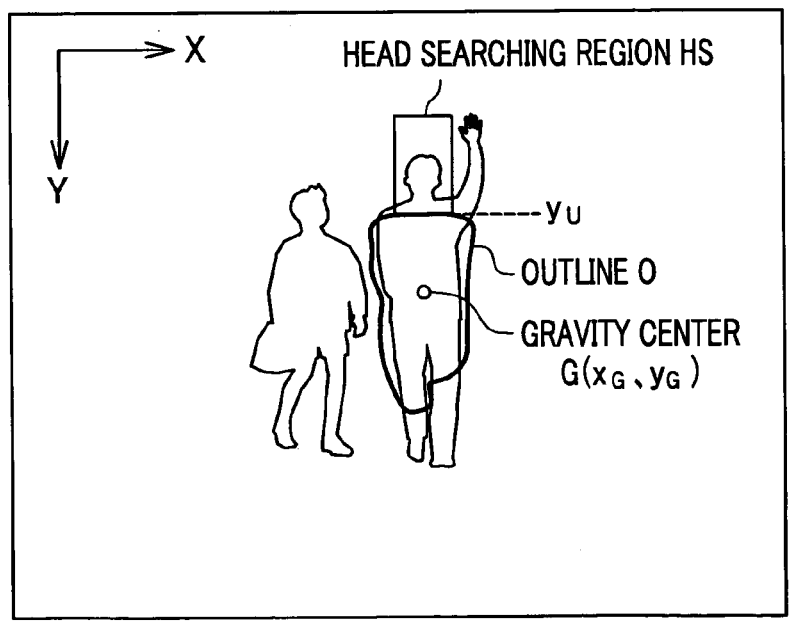
FIG. 18 is a drawing showing an example of setting a head searching region in an object distance image.

As shown in FIG. 18, for example, when the coordinate of the center of gravity G in the outline O is set to ($x_G$ and $y_G$), and the Y coordinate of the outline O of the uppermost end in X coordinate of the center of gravity G is set to $y_U$ in the object distance image TD, this head searching region setting unit 21 sets the lower limit to $y_U$ or below a prescribed distance (for example, 0.2 m) from $y_U$ as the range in the perpendicular direction of the head searching region HS, and sets the upper limit to the position corresponding to a specific size (for example, 2 m). The position of the upper end $y_T$ on the object distance images (2) illustrated in FIGS. 16A, 16B for the upper limit can be used.

The lower limit of the head searching region is different depending on the accuracy of the outline. For example, when the outline can be faithfully extracted to the person's head, the lower limit is set to below a prescribed distance (for example, 0.2 m) from the Y coordinate of the outline O of the uppermost end in the X coordinate of the center of gravity G. When the person's head cannot be extracted as the outline, the Y coordinate of the outline O of the uppermost end in the X coordinate of the center of gravity G is set to the lower limit. When the accuracy of the outline is unstable, it is preferable to set below a prescribed distance to the lower limit from the Y coordinate of the outline O of the uppermost end.

The range in the horizontal direction of the head searching region HS is set to, for example, the ranges of ±0.2 (m) in the right and left sides of the Y coordinate of the center of gravity G.

The head searching region HS set by the head searching region setting unit 21 is outputted to the histogram generating unit 22.

The histogram generating unit 22 measures and totals the number of pixels in the horizontal direction for every coordinate in the perpendicular direction in the range of the head searching region set by the head searching region setting unit 21 in the object distance image. Here, the histogram generating unit 22 generates the histogram by totaling the measured number of pixels in the horizontal direction. In this histogram, it can be considered that the person exists in the coordinate in the perpendicular direction in which the number of pixels is totaled.

It is preferable that the histogram generating unit 22 smoothes the generated histogram as in the histogram generating unit 16a described in FIG. 2.

Specifically, Sy, Sy' and $y_o$ are respectively set to the number of pixels of the coordinate y noted in the histogram, the number of pixels of the coordinate y of the histogram after smoothing, and a positive constant, and the smoothing is performed by the following formula (15). Here, f (n), which is a function of n, may be a constant.

$$S'_y = \sum_{n=y-y_0}^{y-1} \frac{S_n}{f(n)} + S_y + \sum_{n=y+1}^{y+y_0} \frac{S_n}{f(n)} \qquad (15)$$

The perpendicular range setting unit 23 sets the range of the head region in the perpendicular direction based on the histogram (the number of pixels in the horizontal direction) generated by the histogram generating unit 22. Here, the perpendicular range setting unit 23 sets the coordinates of the highest point to the upper end of the head region in the coordinate in the perpendicular direction in which the number of pixels in the horizontal direction is more than the predetermined threshold value. The perpendicular range setting unit 23 sets the coordinate below the upper end of the head region by the specific length (for example, 0.3 m) to the lower end of the head region.

The level range setting unit 24 sets the range in the horizontal direction of the head region in the range of the head searching region. Here, the level range setting unit 24 sets the specific length (for example, 0.2 m) to the range in the horizontal direction of the head region provided at its center with the X coordinate (refer to FIG. 18) of the center of gravity G in the outline O.

Figure 19A:
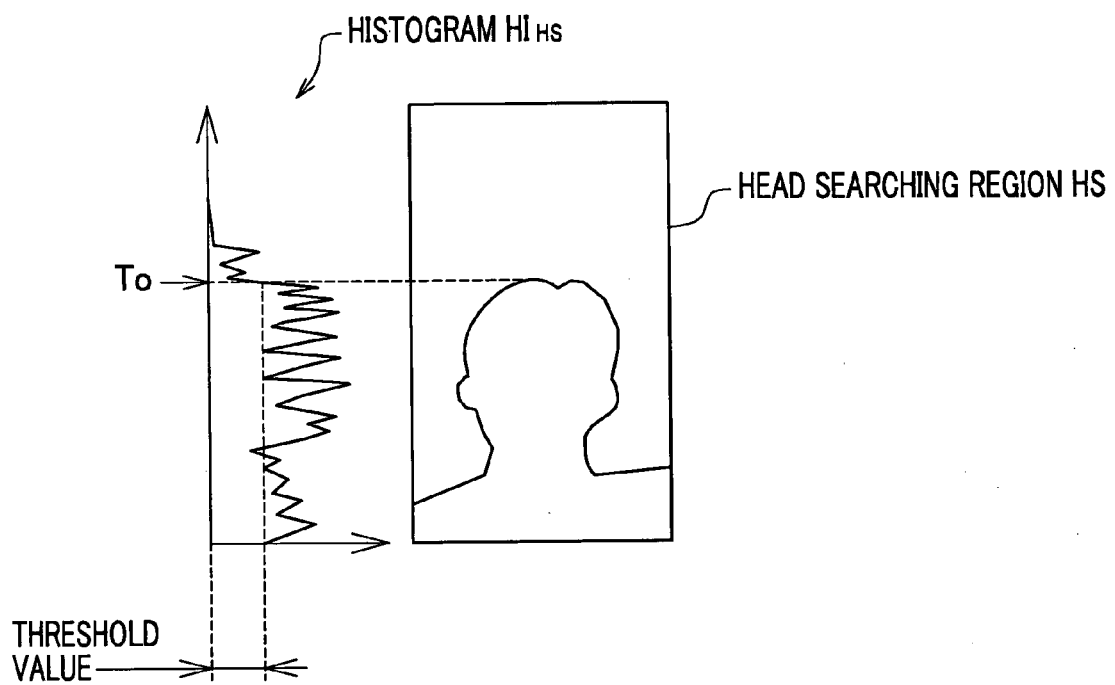
FIG. 19A is an illustration of a procedure for setting a head region in a head searching region.
Figure 19B:
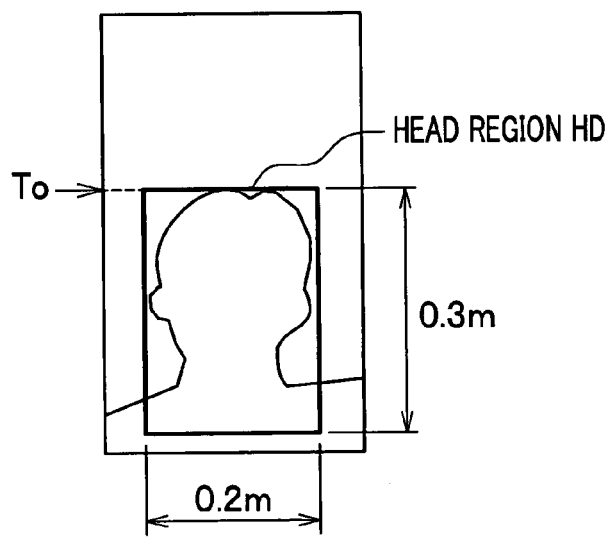
FIG. 19B is an illustration of a head region set in a head searching region in FIG. 19A.

Next, with reference to FIGS. 19A, 19B (to FIG. 3 appropriately), a procedure for setting the head region in the head searching region will be described. FIGS. 19A, 19B are illustrations for describing a procedure for setting a head region in the head searching region.

First, as shown in FIG. 19A, the histogram generating unit 22 generates the histogram $HI_{HS}$ obtained by measuring and totaling the number of pixels in the horizontal direction in the head searching region HS. The perpendicular range setting unit 23 sets the coordinate of the highest point as the upper end of the head region in the coordinate in the perpendicular direction in which the number of pixels is totaled. Here, the highest point $T_O$ of the coordinate in the perpendicular direction where the totaled number of pixels is not less than the predetermined threshold value is set to the upper end of the head region in consideration of noise, for example.

As shown in FIG. 19B, the perpendicular range setting unit 23 sets the coordinate below the highest point To by 0.3 m to the lower end of the head region HD.

The level range setting unit 24 sets the range of 0.2 m to the range in the horizontal direction of the head region HD provided at its center the X coordinates of the center of gravity of the outline.

Thus, the set head region HD (position information of the head region) is outputted to the face region extracting unit 30 (refer to FIG. 1).

<Face Region Extracting Unit 30>

Figure 4:
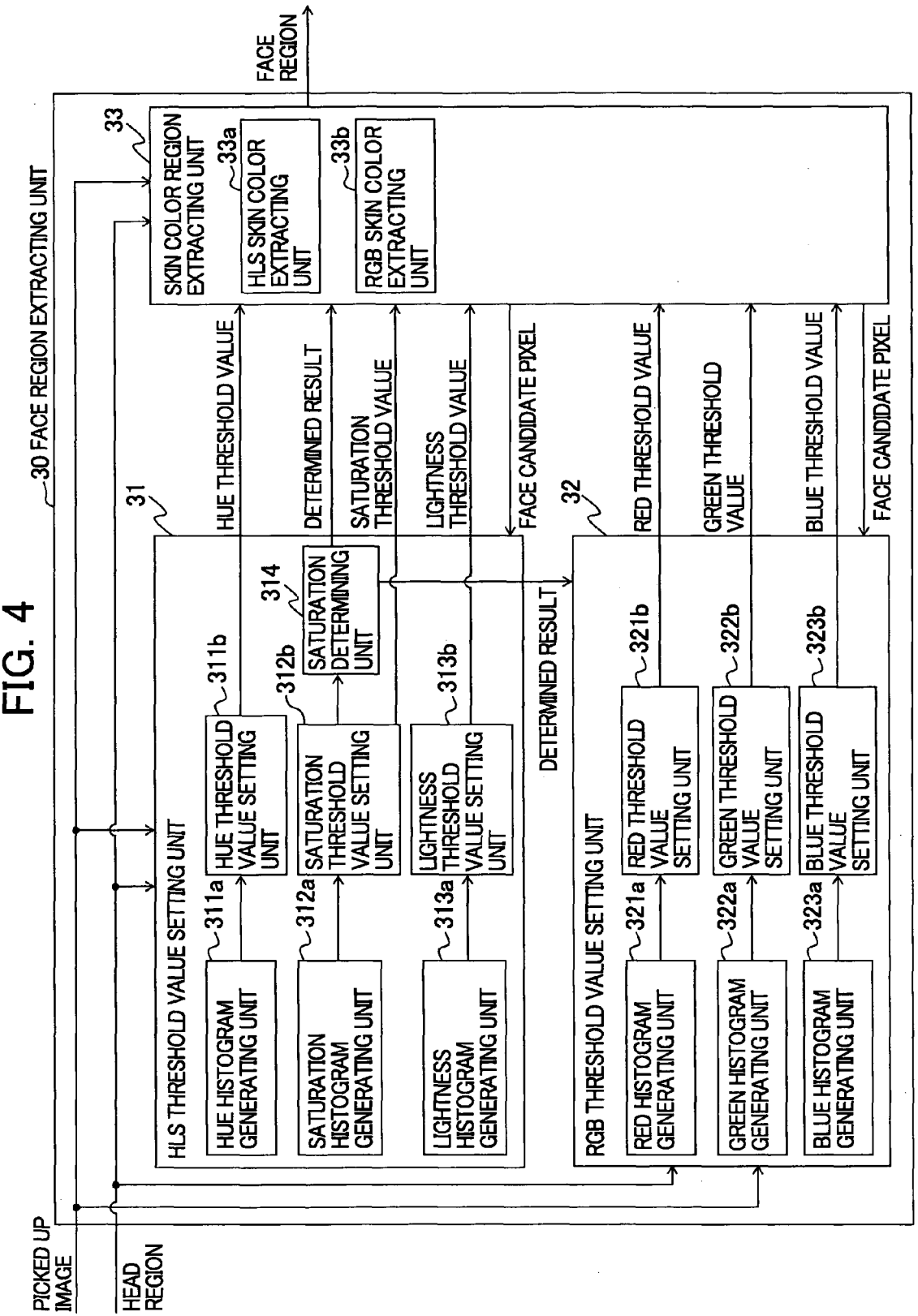
FIG. 4 is a block diagram showing a construction of a face region extracting unit contained in a face region estimating device according to the present invention.

Now referring to FIG. 4, the construction of the face region extracting unit 30 will be described. FIG. 4 is a block diagram showing a construction of a face region extracting unit contained in the face region estimating device according to the present invention. As shown in FIG. 4, the face region extracting unit 30 extracts the face region as the skin color region in the head region set by the head region setting unit 20 referring to the picked-up image taken by the camera 2 (refer to FIG. 1). Here, the face region extracting unit 30 includes the HLS threshold value setting unit 31, the RGB threshold value setting unit 32 and the skin color region extracting unit 33.

The HLS threshold value setting unit 31 sets each range of hue, saturation, and lightness in the color region most distributed in HLS color space in the head region of the picked-up image, as a threshold value. The threshold value thus set is used as a standard in extracting the skin color region from the picked-up image in the skin color region extracting unit 83 (to be described below).

The HLS threshold value setting unit 31 comprises a hue histogram generating unit 311a, a hue threshold value setting unit 311b, a saturation histogram generating unit 312a, a saturation threshold value setting unit 312b, a lightness histogram generating unit 313a, a lightness threshold value setting unit 313b and a saturation determining unit 314.

The hue histogram generating unit 311a measures and totals the number of pixels for every hue value showing the tone of color in the head region of the picked-up image. The hue can be expressed with the value of 0° to 360° in anticlockwise direction on the basis of red on a hue circle. Here, the hue histogram generating unit 311a totals the number of pixels for every position (0° to 360°) in the hue circle as the hue value to generate the histogram (hue histogram). This hue histogram can grasp which hue value is most distributed in the head region.

The hue threshold value setting unit 311b sets the upper and lower limit values of the hue range in which the number of pixels totaled by the hue histogram generating unit 311a becomes the largest in the predetermined range as the hue threshold value. The hue threshold value setting unit 311b searches for the range in which the number of pixels is the largest in the predetermined range (hue threshold value width) in the hue histogram generated by the hue histogram generating unit 311a, to set the hue threshold value. The hue threshold value thus set is outputted to the skin color region extracting unit 33.

The saturation histogram generating unit 312a measures and totals the number of pixels for every saturation value showing the vividness of a color in the head region of the picked-up image. The saturation is the strength of the color tone expressed in hue, i.e., a high saturation value shows a bright color, and low saturation value shows a cloudy color (gray). The strength of the saturation can be expressed by the value of 0 to 100%. Here, the saturation histogram generating unit 312a totals the number of pixels every 0 to 100% as the saturation value to generate the histogram (saturation histogram). This saturation histogram can grasp which saturation value is most distributed in the head region.

The saturation histogram generating unit 312a measures the number of pixels for every saturation value in the pixel (face candidate pixel) contained in the range of the hue threshold value in the head region outputted from the HLS skin color extracting unit 33a. Thereby, the number of pixels to be totaled can be reduced and computing speed can be increased.

The saturation threshold value setting unit 312b sets the upper and lower limit values of the saturation range in which the number of pixels totaled by the saturation histogram generating unit 312a is the largest in the predetermined range, as the saturation threshold values. The saturation threshold value setting unit 312b searches for the range in which the number of pixels is the largest in the predetermined range (saturation threshold value width) in the saturation histogram generated by the saturation histogram generating unit 312a, to set a saturation threshold value. The saturation threshold value thus set is outputted to the saturation determining unit 314 and the skin color region extracting unit 33.

The lightness histogram generating unit 313a measures and totals the number of pixels for every lightness value showing the lighting of color in the head region of the picked-up image. The lightness becomes white and black in the brightest and the darkest states, respectively. The lightness can be expressed from the darkest to the brightest states with the value of 0 to 100%. The lightness histogram generating unit 313a totals the number of pixels every 0 to 100% as the lightness value to generate the histogram (lightness histogram). This lightness histogram can grasp which lightness value is most distributed in the head region.

The lightness histogram generating unit 313a measures the number of pixels for every lightness value in the pixel (face candidate pixel) contained in the range of the hue and saturation threshold values in the head region outputted from the HLS skin color extracting unit 33a. Thereby, the number of pixels to be totaled can be reduced and computing speed can be increased.

The lightness threshold value setting unit 313b sets the upper and lower limit values of the lightness range in which the number of pixels totaled by the lightness histogram generating unit 313a becomes the largest in the predetermined range as the lightness threshold value. Here, the lightness threshold value setting unit 313b searches for the range in which the number of pixels is the largest in the predetermined range (lightness threshold value width) in the lightness histogram generated by the lightness histogram generating unit 313a, and sets the lightness threshold value. The lightness threshold value thus set is outputted to the skin color region extracting unit 33.

Figure 20A:
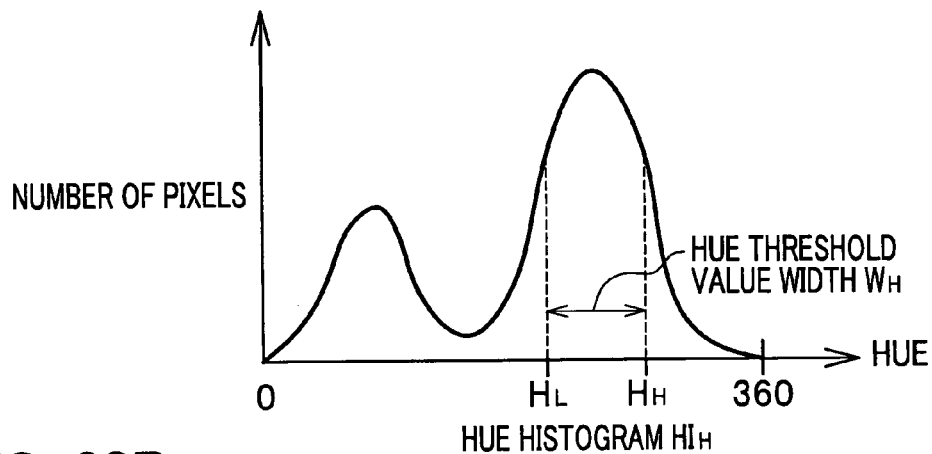
FIG. 20A is a drawing showing a technique for setting a hue threshold value from a hue histogram.
Figure 20B:
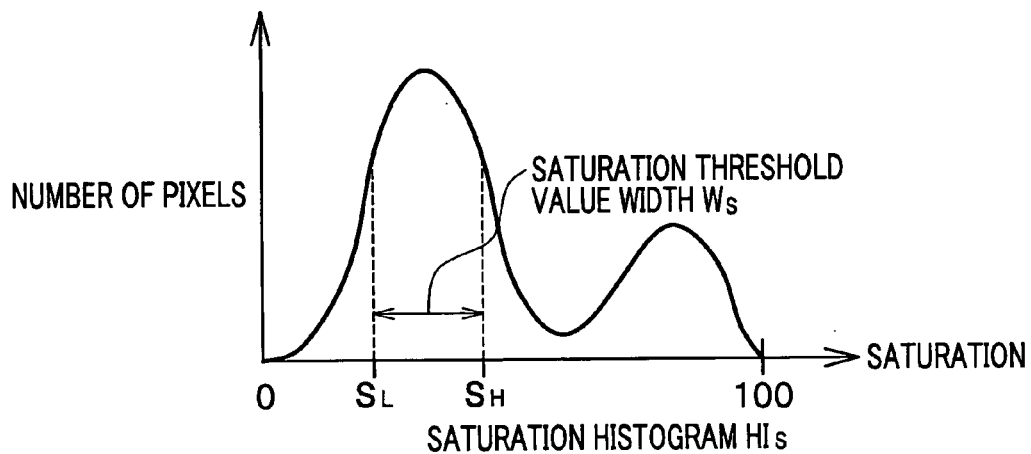
FIG. 20B is a drawing showing a technique for setting a saturation threshold value from a saturation histogram.
Figure 20C:
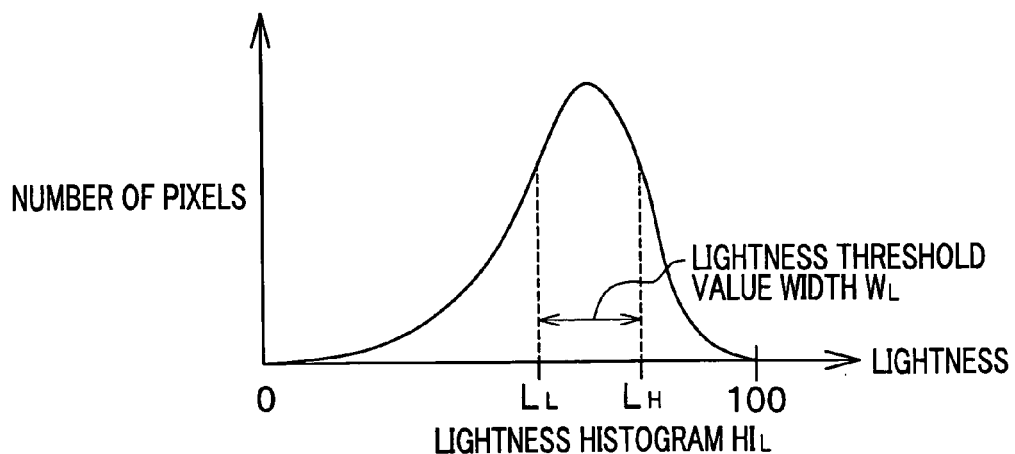
FIG. 20C is a drawing showing a technique for setting a lightness threshold value from a lightness histogram.

Next will be described referring to FIGS. 20A, 20B, 20C (to FIG. 4 appropriately), techniques for using the HLS threshold value setting unit 31 to set hue, saturation, and lightness threshold values. FIGS. 20A, 20B, 20C are drawings to show a technique for setting hue, saturation, and lightness threshold values from hue, saturation, and lightness histograms, respectively.

First, the HLS threshold value setting unit 31 uses the hue histogram generating unit 311a to measure and total the number of pixels for every hue value in the head region HD (refer to FIG. 19) to generate the hue histogram $HI_H$, as shown in FIG. 20A. Then, the hue threshold value setting unit 311b is used to search a position where the number of pixels in the hue threshold value width $W_H$ becomes the largest, while sliding in the range of 0° to 360° the threshold value width (hue threshold value width $W_H$) within the predetermined range. The lower limit value $H_L$ and upper limit value $H_H$ of the hue threshold value width $W_S$ with which the number of pixels become the largest is set as the hue threshold value.

The HLS threshold value setting unit 31 uses the saturation histogram generating unit 312a to measure and total the number of pixels for every saturation value in the head region HD (refer to FIG. 19), to generate the saturation histogram His, as shown in FIG. 20B. Then the saturation threshold value setting unit 312b searches for a position where the number of pixels in the saturation threshold value width $W_S$ is the largest, while sliding in the range of 0 to 100% the threshold value width (saturation threshold value width $W_S$) of the predetermined range. The lower limit value $S_L$ and upper limit value $S_H$ of the hue threshold value width $W_S$ in which the number of pixels is the largest are set as the saturation threshold values.

Also, like the saturation threshold value setting unit 312b, the lightness threshold value setting unit 313b sets as the lightness threshold value, the lower limit value $L_L$ and upper limit value $L_H$ of the lightness threshold value width $W_L$ where the number of pixels becomes the largest with the lightness threshold value width $W_L$, as shown in FIG. 20C.

Referring back to FIG. 4, the saturation determining unit 314 determines the height of the saturation of the picked-up image based on the saturation threshold set by the saturation threshold value setting unit 312b.

Here, if the saturation of the picked-up image is low, the image has a color near gray regardless of hue, and it is difficult to extract skin color using the hue value. Then, the saturation determining unit 314 determines whether it is appropriate to use the hue, saturation and lightness threshold values according to HLS color space as the threshold values for extracting the skin color based on the saturation height. Specifically, the saturation determining unit 314 determines that the saturation is low, when the lower limit value $S_L$ (refer to FIG. 20) of the saturation threshold value is "0."

Here, although the height of the saturation is determined by whether the lower limit value of the saturation threshold value is "0", the saturation may be determined to be low when the lower limit is below a threshold value provided in advance. The determined result of the saturation due to the saturation determining unit 314 is outputted to the RGB threshold value setting unit 32 and the skin color region extracting unit 33.

The RGB threshold value setting unit 32 sets as the threshold the concentrations ranges for red, green and blue in the color region most distributed in the RGB color space in the head region of the picked-up image. This RGB threshold value setting unit 32 operates when the saturation determining unit 314 in the HLS threshold value setting unit 31 determines in the saturation height determination that the saturation is low.

Here, the RGB threshold value setting unit 32 includes a red histogram generating unit 321a, a red threshold value setting unit 321b, a green histogram generating unit 322a, a green threshold value setting unit 322b, a blue histogram generating unit 323a and a blue threshold value setting unit 323b.

The red histogram generating unit 321a measures and totals the number of pixels for every concentration of red in the head region in the picked-up image. The red concentration value can be expressed in gradation values (for example, 256 gradation), or in a relative value (0 to 100%) with the largest gradation value being set to 100%. Here, the red histogram generating unit 321a totals the number of pixels for every red relative value to generate the histogram (red histogram). This red histogram can grasp which red concentration value is most distributed in the head region.

The red threshold value setting unit 321b sets the upper and lower limit values of the red range in which the number of pixels measured by the red histogram generating unit 321a is the largest in the predetermined range, as the red threshold. The red threshold value setting unit 321b searches for the range in which the number of pixels is the largest in the predetermined range (red threshold value width) in the red histogram generated by the red histogram generating unit 321a, to set the red threshold value. The red threshold value thus set is outputted to the skin color region extracting unit 33.

The explanation of the green histogram generating unit 322a and blue histogram generating unit 323a is omitted because red as the object to be measured is only replaced by green or blue in the red histogram generating unit 321a.

The explanation of the green threshold value setting unit 322b and blue threshold value setting unit 323b is omitted because red as the object is only replaced by green or blue in the red threshold value setting unit 321b.

Like the HLS threshold value setting unit 31, the RGB threshold value setting unit 32 may limit the object pixel in generating the histogram, by extracting the pixels (face candidate pixels) contained in the range of the threshold from the head region at the stage of setting the threshold of each color.

The skin color region extracting unit 33 extracts the skin color region composed of the pixels contained in the range of each threshold value in the head region in the picked-up image, based on the hue, saturation and lightness threshold values set by the HLS threshold value setting unit 31, or the red, green and blue threshold values set by the RGB threshold value setting unit 32. Here, the skin color region extracting unit 33 includes an HLS skin color extracting unit 33a and an RGB skin color extracting unit 33b.

The HLS skin color extracting unit 33a extracts the pixels matching with the range of the lower and upper limit values of each threshold value in the head region of the picked-up image as the skin color pixel, based on the hue, saturation and lightness threshold values set by the HLS threshold value setting unit 31. Thus, the skin color region, i.e., the face region in the head region is extracted. The HLS skin color extracting unit 33a operates when the saturation determining unit 314 of the HLS threshold value setting unit 31 does not determine its the saturation height determination that the saturation is low.

The HLS skin color extracting unit 33a extracts and then outputs to the HLS threshold value setting unit 31, the pixels (face candidate pixels) as the object in the head region in each of the sequentially picked-up images, when the HLS threshold value setting unit 31 sequentially sets the hue, saturation and lightness threshold values. The operation cost required for the HLS threshold value setting unit 31 to set the threshold values can be thus reduced.

The RGB skin color extracting unit 33b extracts as the skin color pixel, the pixel agreeing with the range of the lower and upper limit values of each threshold in the head region of the picked-up image, based on the red threshold value, green threshold value and blue threshold value set by the RGB threshold value setting unit 32. The RGB skin color extracting unit 33b operates when the saturation determining unit 314 of the HLS threshold value setting unit 31 determines in its saturation height determination that the saturation is low.

Like the HLS skin color extracting unit 33a, the RGB skin color extracting unit 33b preferably extracts and outputs to the pixel to the RGB threshold value setting unit 32, the object pixels (face candidate pixels) in the head region in each of the sequentially picked-up images, at the stage when the red, green and blue threshold values are sequentially set.

Figure 21:
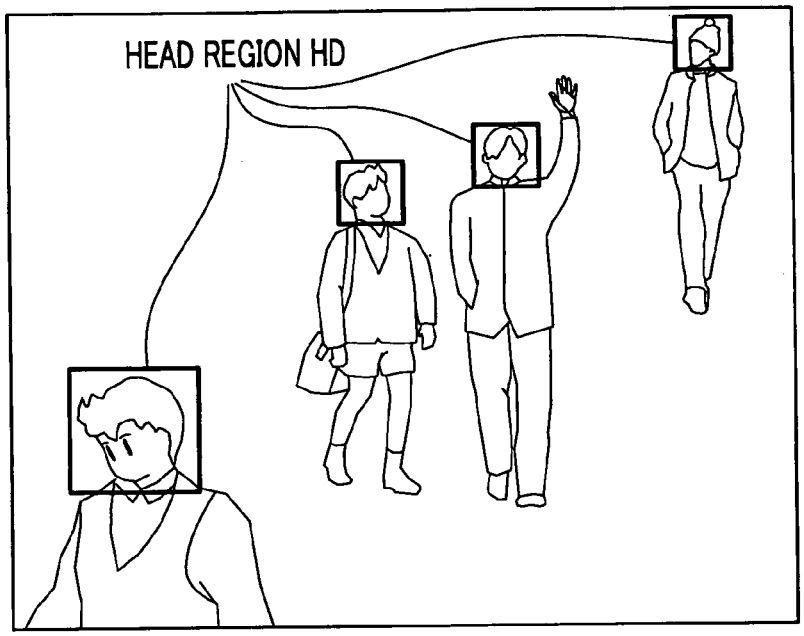
FIG. 21 is a drawing showing an example of extracting a face region from a picked-up image.
Figure 21:
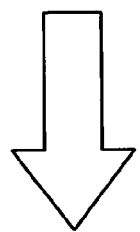
Figure 21:
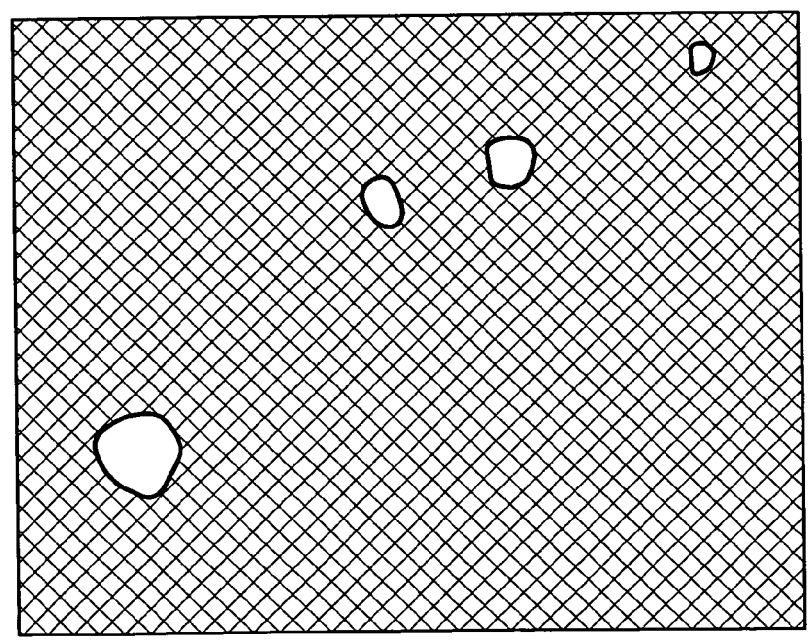

By thus constituting the face region estimating device 1, the head region HD can be set from the picked-up image CI taken by the camera 2, and the face region having the skin color can be extracted in the region, as shown in FIG. 21. In the drawing, the face region image FI obtained by extracting only the extracted face region is shown.

Heretofore, a construction of the face region estimating device 1 has been described in one embodiment, in which the face region estimating device 1 is realized by making a general computer execute a program (face region estimating program) and operating an arithmetic unit and a memory device in the computer.

Also, although the distance information generating unit 11 of the face region estimating device 1 generates the distance image based on the picked-up images taken by two cameras 2, the distance image may be generated by using three or more cameras. For example, the distance to the mobile body can also be more correctly measured by using nine cameras arranged in three rows and three columns with the camera placed at the center as the standard camera to generate the distance image based on the azimuth difference with other cameras.

Further, the face region extracting unit 30 of the face region estimating device 1 extracts the skin color region on the RGB color space when the saturation of the picked-up image is low. However, when the face region estimating device is operated in a limited environment in which the saturation is not low, the saturation determining unit 314, the RGB threshold value setting unit 32 and the RGB skin color extracting unit 33b in the face region extracting unit 30 can be omitted from the construction.

[Operation of Face Region Estimating Device]

Figure 5:
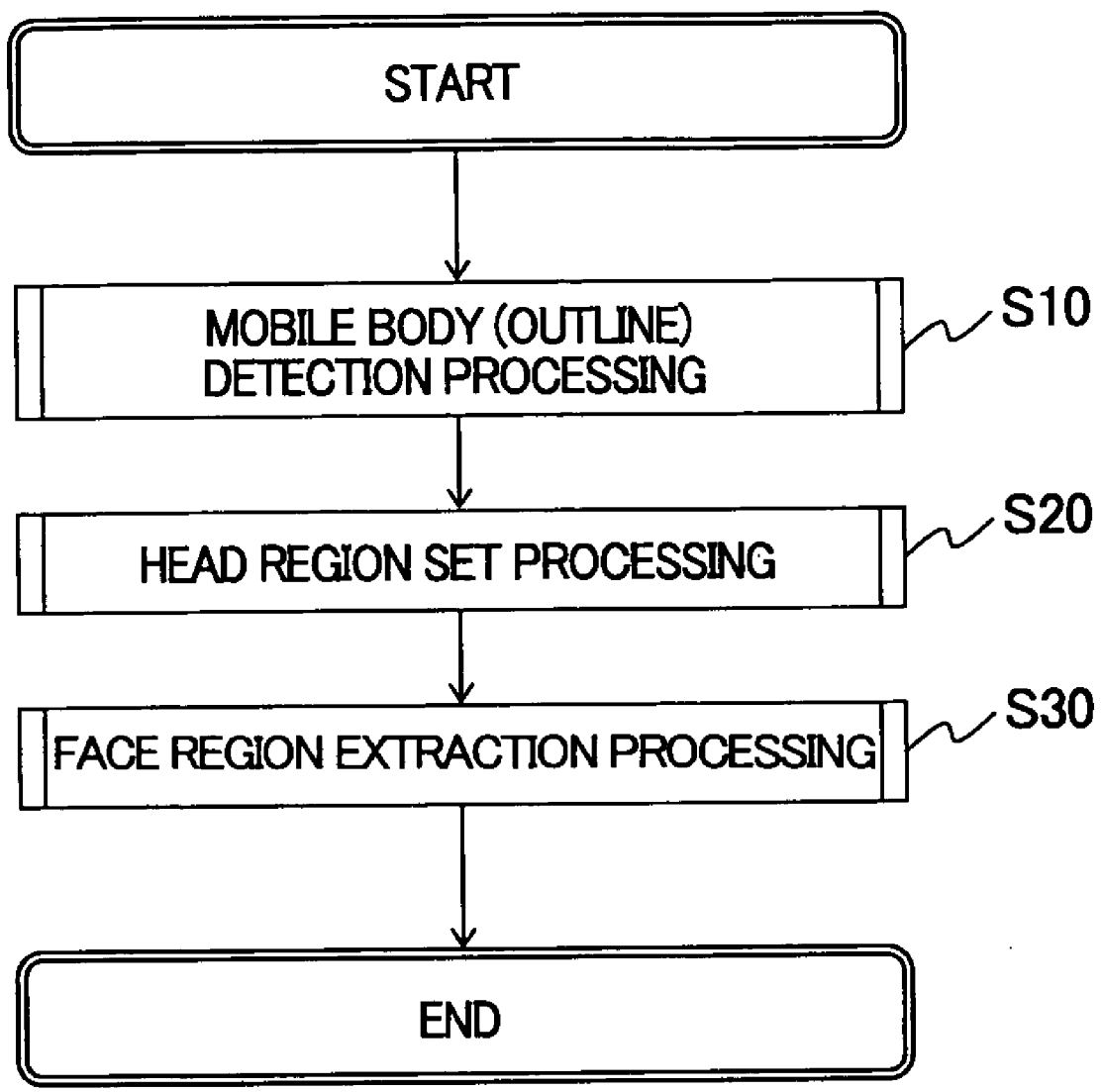
FIG. 5 is a flowchart showing an overall operation of a face region estimating device according to the present invention.

Next, with reference to FIG. 5 (to FIG. 1 appropriately), the operation of the face region estimating device 1 will be described. FIG. 5 is a flowchart showing an overall operation of the face region estimating device according to the present invention.

First, the face region estimating device 1 uses the mobile body detecting unit 10 to detect the moving mobile body from the picked-up image taken by the plurality of cameras 2 (Step 10; mobile body detection step). This Step 10 generates the object distance image composed of the pixels corresponding to the distance in which the mobile body exists, while extracting the outline of the mobile body from the picked-up images.

The face region estimating device 1 then uses the head region setting unit 20 to set the head region of the mobile body extracted in Step 10, assuming the body to be a person (Step 20; head region setting step). That is, the Step 20 sets the head region assuming the mobile body to be the person in the predetermined range based on the pixel position at the upper part of the outline, based on the pixel distribution of the object distance image.

The face region estimating device 1 uses the face region extracting unit 30 to extract the skin color region as the person's face region in the head region set in Step 20, assuming that the color region shown by the hue, saturation and lightness most distributed in the head region as the person's face (skin color) region (Step 30: face region extraction step).

Hereinafter, the operation of mobile body (outline) detection processing of Step 10, head region set processing of Step 20 and face region extraction processing of Step 30 will be discussed in detail.

<Mobile Body (Outline) Detection Processing>

Figure 6:
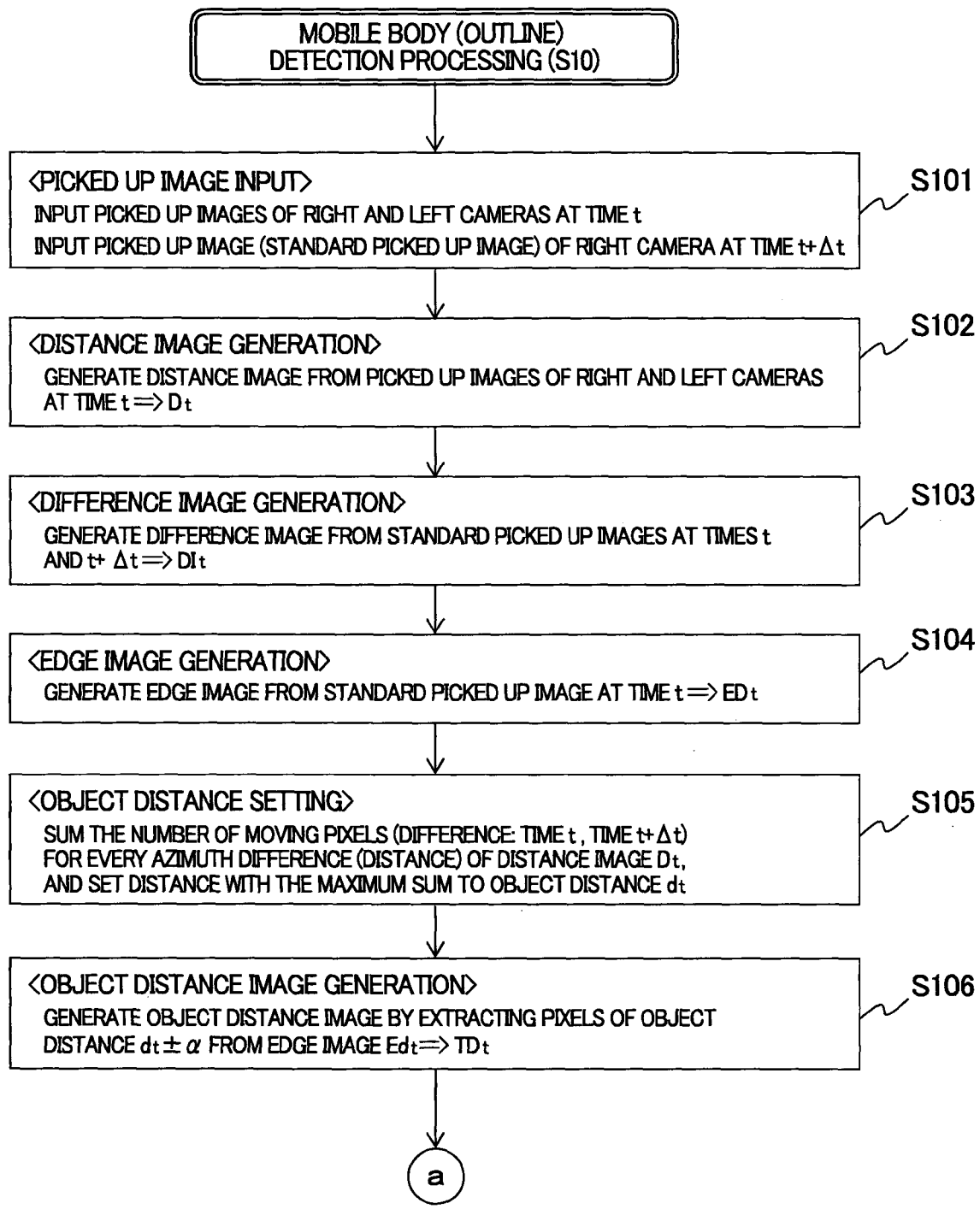
FIG. 6 is a flowchart (1/2) showing an operation of a mobile body (outline) detection processing in a mobile body detecting unit.
Figure 7:
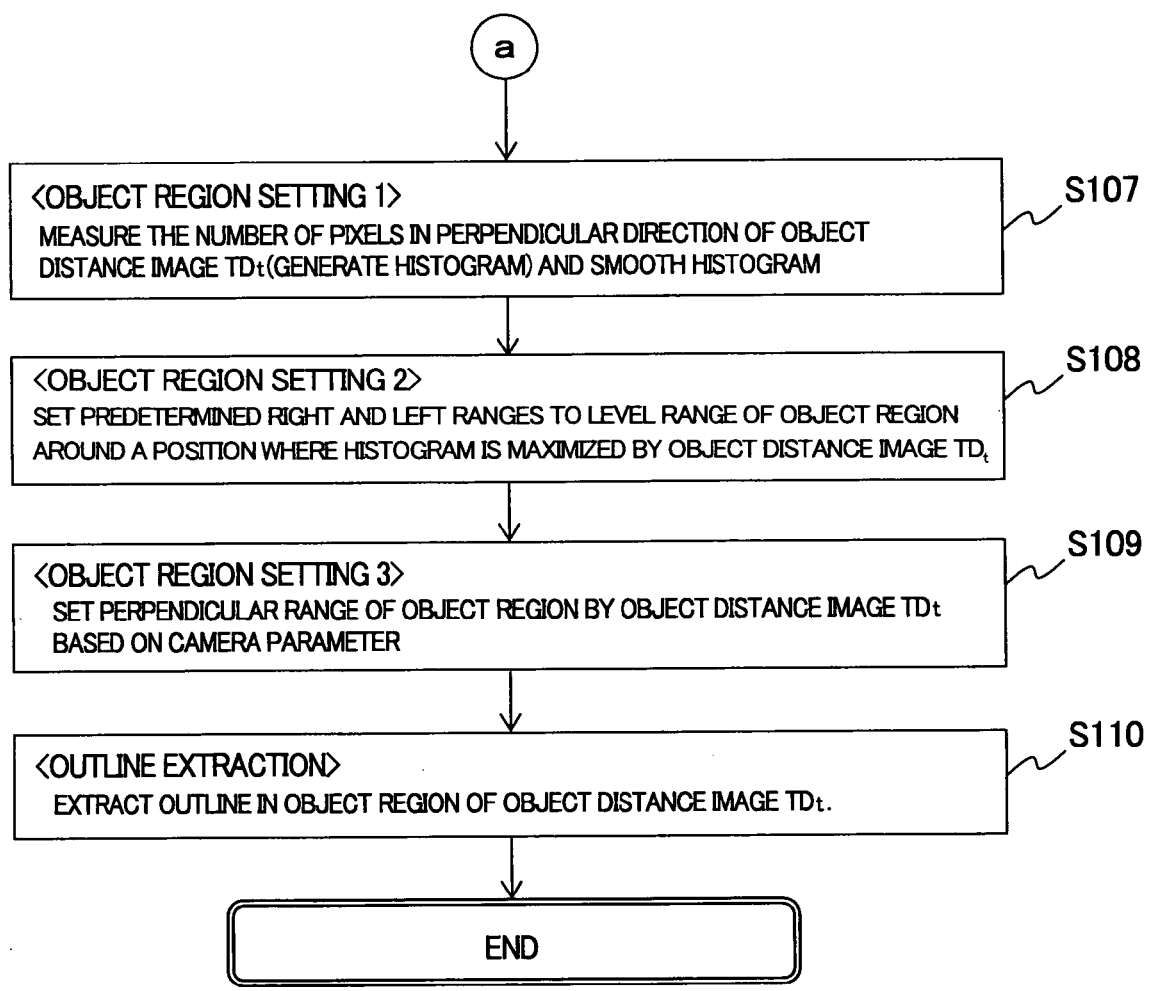
FIG. 7 is a flowchart (2/2) showing the operation of the mobile body (outline) detection processing in the mobile body detecting unit.

First, with reference to FIG. 6 and FIG. 7 (to FIG. 2 appropriately), the operation of the mobile body (outline) detection processing described in Step 10 of FIG. 6 will be described. FIGS. 6 and 7 are flowcharts showing an operation of a mobile body (outline) detection processing by the mobile body detecting unit.

(Picked-Up Image Input Step)

First, the mobile body detecting unit 10 synchronizes and inputs the picked-up images in time series from two cameras 2 (Step 101). Here, the mobile body is extracted based on the picked-up images inputted at a certain time t from the right camera 2a (standard camera) and the left camera 2b, and the picked-up images inputted at the following time $t+\Delta t$ from the right camera 2a (standard camera) and the left camera 2b. The distance images $D_{t-1}$ and $D_{t-2}$, and the object distance images $TD_{t-2}$ and $TD_{t-1}$ used at the following steps are generated at the stages at time t-2 and time t-1.

(Distance Image (Distance Information) Generation Step)

The mobile body detecting unit 10 uses the distance information generating unit 11 to generate from two picked-up images inputted from the right camera 2a (standard camera) and the left camera 2b at time t, a distance image $D_t$ in which is embedded the azimuth difference (distance) therebetween and containing the mobile body (Step 102).

(Difference Image (Motion Information) Generation Step)

The mobile body detecting unit 10 further uses the motion information generating unit 12 to obtain the difference between two (standard) picked-up images taken at times t and $t+\Delta t$ by the right camera 2a (standard camera), so as to generate a difference image $DI_t$ having the pixel value "1" for the pixel with the difference and the pixel value "0" for the pixel with no difference (Step 103).

(Edge Image Generation Step)

The mobile body detecting unit 10 then uses the edge image generating unit 13 to generate the edge image $ED_t$ from the (standard) picked-up image taken at time t by the right camera 2a (standard camera) (Step 104).

(Object Distance Setting Step)

The mobile body detecting unit 10 uses the object distance setting unit 14 to total, from the distance image $D_t$ and difference image $DI_t$ (between times t and t+$\Delta$t) generated in Steps 102 and 103, respectively, the number of moving pixels for every azimuth difference (distance) expressed by the distance image $D_t$. The mobile body detecting unit 10 then sets the distance in which the total is maximized as an object distance $d_t$ of the mobile body as the object to be detected in the distance image $D_t$ (Step 105).

(Object Distance Image Generation Step)

The mobile body detecting unit 10 uses the object distance image generating unit 15 to generate the object distance image $TD_t$ by extracting the pixel of object distance $d_t \pm \alpha$ from the edge image $ED_t$ generated in Step 104 (Step 106).

With this Step 106, the face region estimating device 1 can set the range in the depth direction where the mobile body exists, in the distance image distance image $D_t$ taken at time t.

(Object Region Setting Step)

The mobile body detecting unit 10 uses the histogram generating unit 16a of the object region setting unit 16 to measure the number of pixels in the perpendicular direction (lengthwise direction) of the object distance image $TD_t$ generated in Step 106, and generates the histogram (Step 107). In this Step 107, it is preferable to smooth the histogram.

The mobile body detecting unit 10 then uses the level range setting unit 16b of the object region setting unit 16 to set predetermined right and left regions as the level range of the object region, which is provided at its center the position x1 (see FIG. 15) where the histogram is maximized in the object distance image $TD_t$ taken at time t (Step 108). Here, it is assumed to detect a person, and the object distance image $TD_{t-2}$ at time t-2 and the object distance image $TD_{t-1}$ at time t-1 are used to set a move vector connecting the positions where the histogram is maximized. If the angle between the move vector and visual line direction of the camera 2 is less than 45°, then the central position $x_1 \pm (0.5$ to $0.6)$ m is set to the level range for detecting the person. If the angle between the move vector and visual line direction of the camera 2 is 45° or more, then the central position $x_1 \pm (0.2$ to $0.3)$ m is set to the level range for detecting the person.

The mobile body detecting unit 10 further uses the perpendicular range setting unit 16c of the object region setting unit 16 to set the range for the perpendicular (up and down) direction of the object region in the object distance image $TD_t$, based on camera parameters inputted from the camera 2 such as the tilt angle and height from the floor (installation surface) (Step 109).

For example, the position of the floor (lower end of the object region) in the object distance image is obtained based on the tilt angle of the camera 2 and the height from the floor. Then, based on the distance between the field angle of the camera 2 and the mobile body, the range up to 2 m from the floor is converted to the number of pixels, to obtain the number of pixels from the floor in the object distance image of the object region. Thereby, the upper end of the object region in the object distance image can be obtained. The distance of 2 m is only an example, and another length (height) may be used.

(Outline Extraction Step)

The mobile body detecting unit 10 uses the outline extracting unit 17 to extract the outline in the object region set in Steps 108 and 109 in the object distance image $TD_t$ creted in Step 106 (110). For example, the outline is extracted by applying a dynamic outline model (SNAKES) in the object region.

Thus, the foregoing operation can detect the mobile body from the picked-up image inputted from the cameras 2

<Head Region Set Processing>

Figure 8:
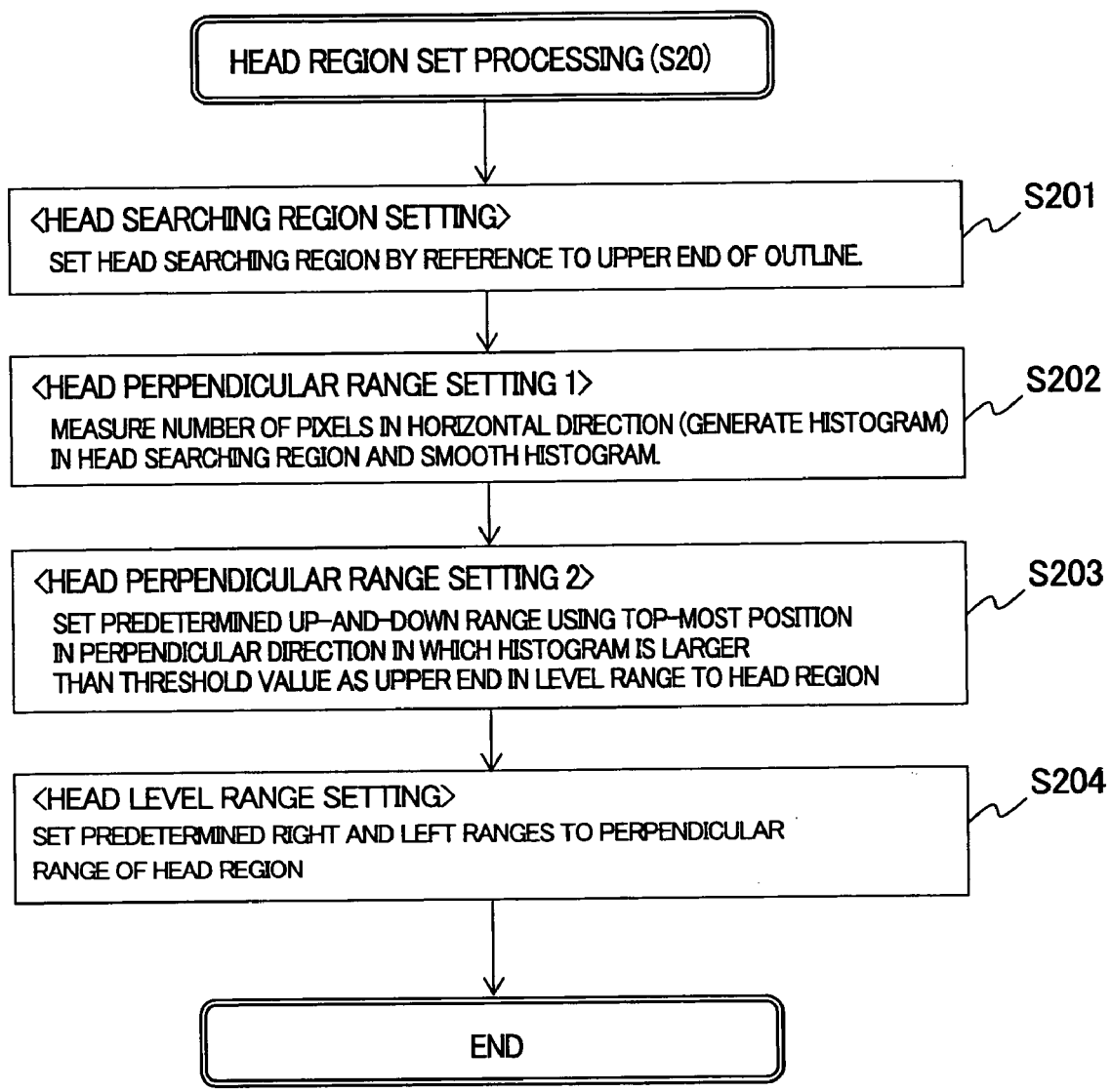
FIG. 8 is a flowchart showing an operation of a head region set processing in a head region setting unit.

Next, with reference to FIG. 8 (to FIG. 3 appropriately), the operation of the head region set processing described in Step 20 of FIG. 5 will be described. FIG. 8 is a flowchart showing an operation of a head region set processing in a head region setting unit.

(Head Searching Region Setting Step)

First, the head region setting unit 20 uses the head searching region setting unit 21 to set as the region (head searching region) for searching the person's head, a region with the range predetermined on the basis of the pixel position at the upper part (top end) of the outline (Step 201). Here, the head searching region setting unit 21 sets the range in the perpendicular direction of the head searching region on the basis of the position (x, y), wherein x is the X coordinate of the center of gravity of the outline and y is the Y coordinate of the uppermost end of the outline in the coordinate. For example, the lower limit of the head searching region is set to a prescribed distance (for example 0.2 m) below y, and the upper limit to a position corresponding to a specific size (for example 2 m).

(Head Perpendicular Range Setting Step)

The head region setting unit 20 uses the histogram generating unit 22 to measure the number of pixels in the horizontal direction for every coordinate in the perpendicular direction in the range of the head searching region set by the head searching region setting unit 21 in the object distance image, and then generates the histogram (Step 202). In this Step 202, it is preferable to smooth the histogram.

The head region setting unit 20 uses the perpendicular range setting unit 23 to set, for the coordinate in the perpendicular direction where the number of pixels in the horizontal direction exceeds the predetermined threshold in the histogram generated in Step 202, a predetermined up-and-down range with the coordinate of the highest point being set to the upper end of the head region to the level range of the head region. Specifically, the perpendicular range of the head region is set by setting the coordinate below the upper end by a specific length (for example, 0.3 m) to the lower end of the head region (Step 203).

(Head Level Range Setting Step)

The head region setting unit 20 further uses the level range setting unit 24 to set the predetermined right and left ranges to the level range of the head region which is provided at its center with the X coordinates of the center of gravity in the outline. Specifically, the specific length (for example, 0.2 m) is set as the level range of the head region with the X coordinate of gravity provided at the center thereof (Step 204).

Thus, the forgoing operation can specify the position in the picked-up image inputted from the camera 2 where the person's head region exists (FIG. 1).

<Face Region Extraction Processing>

Figure 9:
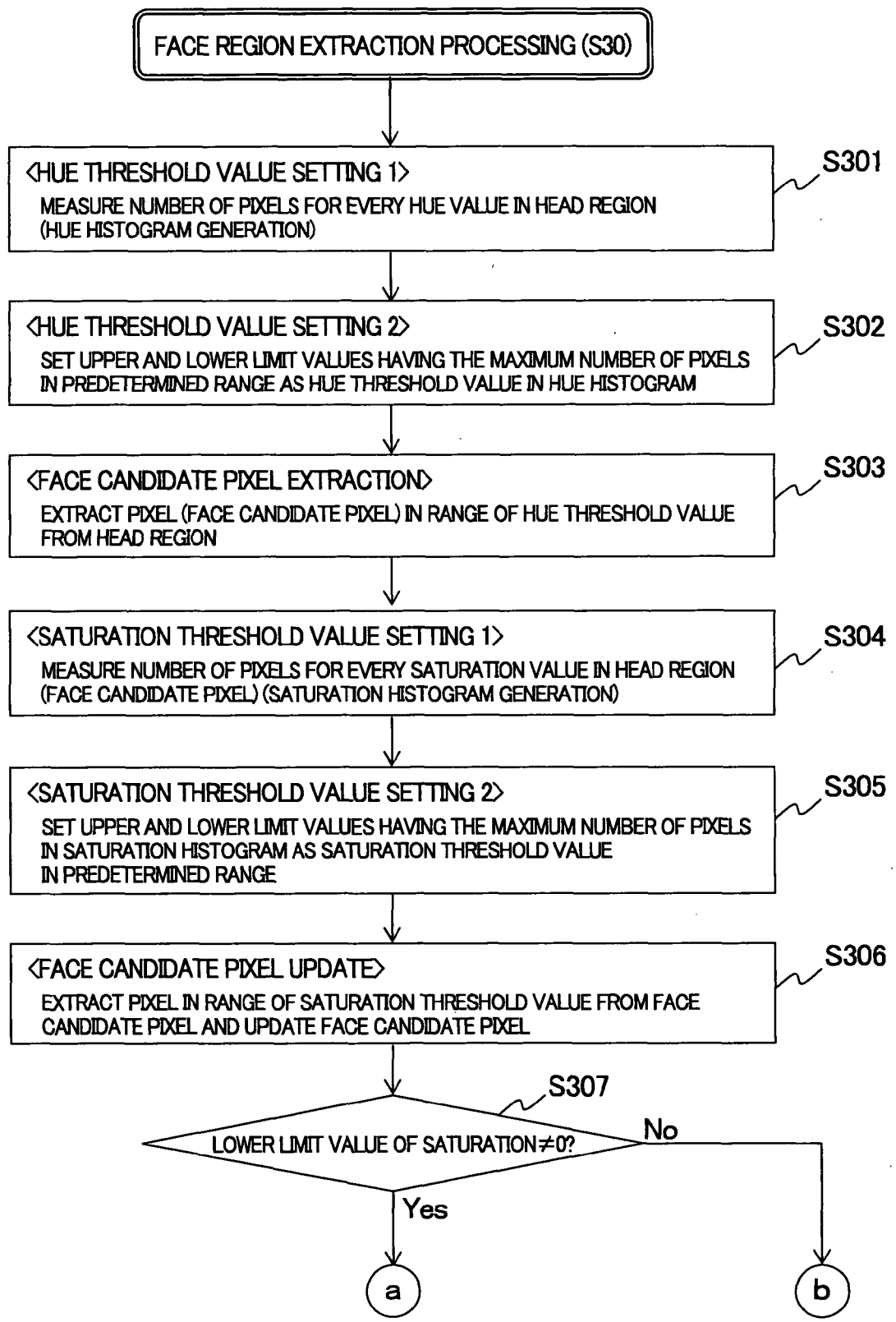
FIG. 9 is a flowchart (1/2) showing an operation of a face region extraction processing in a face region extracting unit.
Figure 10:
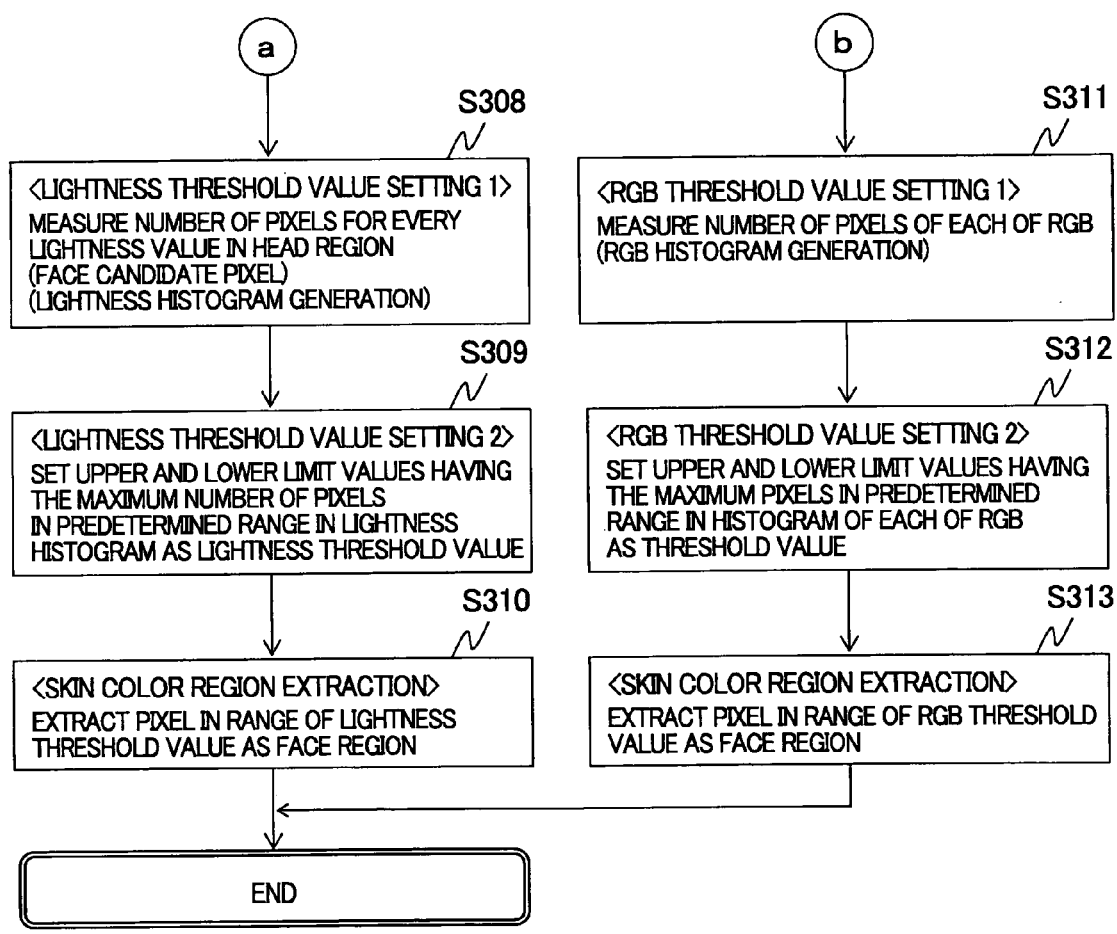
FIG. 10 is a flowchart (2/2) showing the operation of the face region extraction processing in the face region extracting unit.

Next will be described, with reference to FIGS. 9 and 10 (to FIG. 4 appropriately), the operation of the face region extraction processing described in Step 30 of FIG. 5. FIGS. 9 and 10 are flowcharts showing an operation of a face region extraction processing in a face region extracting unit.

(Hue Threshold Value Setting Step)

First, the face region extracting unit 30 uses the hue histogram generating unit 311a of the HLS threshold value setting unit 31 to measure the number of pixels for every hue value in the head region of the picked-up image into a histogram, so as to generate a hue histogram (Step 301).

Thereafter, the face region extracting unit 30 uses a hue threshold value setting unit 311b to search for the range in the predetermined range (hue threshold value width) in the hue histogram which has the largest number of pixels, and sets the upper and lower limit values of the searched range as the hue threshold values (Step 302).

(Face Candidate Pixel Extraction Step)

The face region extracting unit 30 uses the HLS skin color extracting unit 33a of the skin color region extracting unit 33 to extract from the head region, the pixels (face candidate pixels) contained in the range of the hue threshold values (Step 303).

(Saturation Threshold Setting Step)

The face region extracting unit 30 uses the saturation histogram generating unit 312a of the HLS threshold value setting unit 31 to measure the number of pixels for every saturation value in the face candidate pixels extracted in Step 303 into a histogram, so as to generate a saturation histogram (Step 304).

Then, the face region extracting unit 30 uses the saturation threshold value setting unit 312b to search for the range with the largest number of pixels in the predetermined range (saturation threshold value width) in the saturation histogram, and sets the upper and lower limit values of the searched range as the saturation threshold values (Step 305).

(Face Candidate Pixel Update Step)

The face region extracting unit 30 uses the HLS skin color extracting unit 33a to extract from the face candidate pixels the pixels contained in the range of the saturation threshold values, and updates the face candidate pixels (Step 306).

(Saturation Determining Step)

The face region extracting unit 30 uses the saturation determining unit 314 to determine the height of the saturation of the picked-up image based on the saturation threshold values set in Step 305. Here, it is determined whether the lower limit value of the saturation threshold value is not "0" (Step 307).

If the lower limit value of the saturation threshold value is not "0" (Yes in Step 307), then the face region extracting unit 30 determines that the skin color can be extracted in the HLS color space, and proceeds to the lightness threshold setting step of Step 308 (FIG. 10).

If the lower limit value of the saturation threshold value is "0" (No in Step 307), then the face region extracting unit 30 determines it is not possible to extract the skin color in the HLS color space, and proceeds to the RGB threshold setting step of Step 311.

(Lightness Threshold Setting Step)

When the lower limit value of the saturation threshold value is not "0," the face region extracting unit 30 uses the lightness histogram generating unit 313a of the HLS threshold value setting unit 31 to measure the number of pixels for every lightness value in the face candidate pixels extracted in Step 306 into a histogram, so as to generate a lightness histogram (Step 308).

Then, the face region extracting unit 30 uses the lightness threshold value setting unit 313b to search for the range with the largest number of pixels in the predetermined range (lightness threshold value width) in the lightness histogram, and sets the upper and lower limit values of the search range as the lightness threshold values (Step 309).

(Skin Color Region Extraction Step)

The face region extracting unit 30 uses the HLS skin color extracting unit 33a of the skin color region extracting unit 33 to extract the pixels in the range of the lightness threshold values set in Step 309 as the skin color (face) region (Step 310). In this Step 310, extracting the pixels in the range of the hue, saturation and lightness threshold values from the head region and the whole picked-up image respectively allows extraction of the face region, and the skin color region other than the face such as a hand.

(RGB Threshold Value Setting Step)

If the lower limit value of the saturation threshold value is "0" in Step 307, then the face region extracting unit 30 uses the RGB threshold value setting unit 32 to measure the number of pixels for each RGB color in the head region into a histogram, so as to generate each histogram (Step 311).

Specifically, the red histogram generating unit 321a, the green histogram generating unit 322a, and the blue histogram generating unit 323a measure the number of pixels for every concentrations of red, green and blue to generate red, green and blue histograms, respectively.

The face region extracting unit 30 uses the RGB threshold value setting unit 32 to set as the threshold values the upper and lower limit values having the largest number of pixels in the predetermined range in the RGB histograms generated in Step 311 (Step 312).

Specifically, the red, green and blue threshold value setting unit 321b, 322b, 323b search for a range with the largest number of pixels in the predetermined range in the red, green and blue histograms (red, green and blue threshold value widths), to set the upper and lower limit values for the searched ranges as the red, green an blue threshold values, respectively.

(Skin Color Region Extraction Step)

The face region extracting unit 30 uses the RGB skin color extracting unit 33b of the skin color region extracting unit 33 to extract the pixels in the range of the threshold values (red, green and blue threshold values) set in Step 312 as the skin color (face) region (Step 313).

With each of the abovementioned steps, the face region estimating device 1 of the embodiment can estimate and extract the region of the person's face from the picked-up image inputted from the camera. Although the person's face is estimated at a certain time t in the discussion, operating the steps (Steps 10 to 30) for images continuously inputted from the cameras may allow, for example, the moving robot equipped with, for example, the face region estimating device 1 to continuously detect the person's face.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A face region estimating device for estimating a person's face region contained in a plurality of picked-up images from the picked-up images taken of a mobile body by a plurality of cameras, comprising;
   a distance information generating unit for generating a distance to the mobile body as distance information, based on an azimuth difference of the plurality of picked-up images;
   a motion information generating unit for generating motion of the mobile body as motion information, based on a difference of the picked-up images inputted in time series from at least one of the plurality of cameras;
   an object distance setting unit for setting an object distance in which the mobile body exists, based on the distance information and the motion information;
   an object distance image generating unit for generating an object distance image composed of pixels corresponding to the object distance, based on the distance information;
   an object region setting unit for setting an object region containing the region of the mobile body, corresponding to at least the object distance set by the object distance setting unit in the object distance image;
   an outline extracting unit for extracting an outline from the object region set by the object region setting unit;
   a head region setting unit for setting a head region assuming the mobile body to be a person, based on a pixel distribution of the object distance image corresponding to a predetermined range on the basis of a pixel position at the upper part of the outline extracted by the outline extracting unit; and
   a face region extracting unit for extracting the person's face region from the picked-up image, based on the color distribution of the picked-up image corresponding to the head region set by the head region setting unit,
   wherein the face region extracting unit comprises
      an HLS threshold value setting unit for setting upper and lower limit values of hue, saturation, and lightness ranges in which the total of the pixels corresponding to each of the values is the largest in the predetermined range for every value of hue, saturation and lightness value in the head region, as hue, saturation, and lightness threshold values, respectively, wherein a region composed of the pixels contained in the ranges of the hue, saturation and lightness threshold values is provided as the face region, and
      an RGB threshold value setting unit for setting the upper and lower limit values of red, green, and blue ranges in which the total of the pixels corresponding to the concentration value is the largest in the predetermined range for every concentration value of red, green and blue, as three primary colors of light in the head region as red, green, and blue threshold values, respectively,
   wherein the region composed of the pixels contained in the ranges of the red, green, and blue threshold values is set to the face region when the saturation threshold value is or below a predetermined value, and
   wherein the region composed of the pixels contained in the ranges of the hue, saturation, and lightness threshold values is set to the face region when the saturation threshold value is greater than the predetermined value.

2. The face region estimating device as claimed in claim 1, further comprising an edge image generating unit for generating an edge image obtained by extracting an edge of the picked-up image based on color information or shading information of each pixel of the picked-up image, wherein the distance image generating unit extracts the pixel of the edge image corresponding to the object distance based on the distance information and generates the object distance image.

3. The face region estimating device as claimed in claim 1, wherein the head region setting unit totals the pixels in a horizontal direction for every coordinate in a perpendicular direction in the predetermined range based on the pixel position at the upper part of the outline in the object distance image, and sets a range of the perpendicular direction of the head region based on the number of pixels in the horizontal direction.

4. The face region estimating device as claimed in claim 2, wherein the head region setting unit totals the pixels in a horizontal direction for every coordinate in a perpendicular direction in the predetermined range based on the pixel position at the upper part of the outline in the object distance image, and sets a range of the perpendicular direction of the head region based on the number of pixels in the horizontal direction.

5. A face region estimating method for estimating a person's face region contained in a plurality of picked-up images from the picked-up images taken of a mobile body by using the face region estimating device of claim 1, the method comprising:
   (a) generating, at a distance information generating unit, a distance to the mobile body as distance information based on an azimuth difference of the plurality of picked-up images by using the distance information generating unit;
   (b) generating, at a motion information generating unit, motion of the mobile body as motion information based on the difference of the picked-up images inputted in time series from at least one of the plurality of cameras by using the motion information generating unit;
   (c) setting, at an object distance setting unit, an object distance in which the mobile body exists based on the distance information and the motion information by using the object distance setting unit;
   (d) generating, at an object distance image generating unit, an object distance image composed of pixels corresponding to the object distance based on the distance information by using the object distance image generating unit;
   (e) setting, at an object region setting unit, an object region containing the region of the mobile body, corresponding to at least the object distance set by the object distance setting unit in the object distance image by using the object region setting unit;
   (f) extracting, at an outline extracting unit, an outline from the object region set by the setting of the object region by using the outline extracting unit;
   (g) setting, at an head region setting unit, a head region assuming the mobile body to be a person, based on the pixel distribution of the object distance image corresponding to a predetermined range on the basis of a pixel position at the upper part of the outline extracted by extracting of the outline by using the head region setting unit; and
   (h) extracting, at a face region extracting unit, the person's face region from the picked-up image, based on the color distribution of the picked-up image corresponding to the head region set by the setting of the head region by using the face region extracting unit, wherein the extracting step comprises setting upper and lower limit values of hue, saturation, and lightness ranges in which the total of the pixels corresponding to each of the values is the largest in the predetermined range for every value of hue, saturation and lightness value in the head region, as hue, saturation, and lightness threshold values, respectively, and wherein a region composed of the pixels contained in the ranges of the hue, saturation and lightness threshold values is provided as the face region, and setting the upper and lower limit values of red, green, and blue ranges in which the total of the pixels corresponding to the concentration value is the largest in the predetermined range for every concentration value of red, green and blue, as three primary colors of light in the head region as red, green, and blue threshold values, respectively, wherein the region composed of the pixels contained in the ranges of the red, green, and blue threshold values is set to the face region when the saturation threshold value is or below a predetermined value, and wherein the region composed of the pixels contained in the ranges of the hue, saturation, and lightness threshold values is set to the face region when the saturation threshold value is greater than the predetermined value.

6. A computer-readable medium encoded with a computer program, the computer program configured to control a processor equipped with the face region estimating device of claim 1 to perform a method for estimating a person's face region contained in a plurality of picked-up images from the picked-up images taken of a mobile body by a plurality of cameras, the method comprising:

(a) generating a distance to a mobile body as distance information based on an azimuth difference of a plurality of picked-up images;

(b) generating motion of the mobile body as motion information based on the difference of a picked-up images inputted in time series from at least one of the plurality of cameras;

(c) setting an object distance in which the mobile body exists based on the distance information and the motion information;

(d) generating an object distance image composed of pixels corresponding to the object distance based on the distance information;

(e) setting an object region containing the region of the mobile body, corresponding to at least the object distance set by the object distance setting unit in the object distance image;

(f) extracting an outline from the object region set by the setting of the object region;

(g) setting a head region assuming the mobile body to be a person, based on the pixel distribution of the object distance image corresponding to a predetermined range on the basis of a pixel position at the upper part of the outline extracted by extracting of the outline; and (h) extracting the person's face region from the picked-up image, based on the color distribution of the picked-up image corresponding to the head region set by the setting of the head regions, wherein the extracting step comprises:

setting upper and lower limit values of hue, saturation, and lightness ranges in which the total of the pixels corresponding to each of the values is the largest in the predetermined range for every value of hue, saturation and lightness value in the head region, as hue, saturation, and lightness threshold values, respectively, and wherein a region composed of the pixels contained in the ranges of the hue, saturation and lightness threshold values is provided as the face region, and setting the upper and lower limit values of red, green, and blue ranges in which the total of the pixels corresponding to the concentration value is the largest in the predetermined range for every concentration value of red, green and blue, as three primary colors of light in the head region as red, green, and blue threshold values, respectively, wherein the region composed of the pixels contained in the ranges of the red, green, and blue threshold values is set to the face region when the saturation threshold value is or below a predetermined value, and wherein the region composed of the pixels contained in the ranges of the hue, saturation, and lightness threshold values is set to the face region when the saturation threshold value is greater than the predetermined value.

* * * * *